US012322221B1

(12) United States Patent
Orecchio et al.

(10) Patent No.: US 12,322,221 B1
(45) Date of Patent: Jun. 3, 2025

(54) ADAPTIVE MULTI-NETWORK MULTI-BAND VEHICLE COMMUNICATIONS

(71) Applicant: Zoox, Inc., Foster City, CA (US)

(72) Inventors: Paul Orecchio, Denver, CO (US); Ravi Gogna, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 284 days.

(21) Appl. No.: 17/855,231

(22) Filed: Jun. 30, 2022

(51) Int. Cl.
*G07C 5/00* (2006.01)
*B60W 60/00* (2020.01)
*H04B 17/318* (2015.01)

(52) U.S. Cl.
CPC .......... *G07C 5/008* (2013.01); *B60W 60/001* (2020.02); *H04B 17/318* (2015.01); *B60W 2554/4041* (2020.02)

(58) Field of Classification Search
CPC ...... G07C 5/008; H04W 36/14; H04W 24/04; H04W 48/20; H04W 76/15; H04W 36/302; H05K 7/02; H04L 65/61; G01C 21/3415
See application file for complete search history.

(56) References Cited

U.S. PATENT DOCUMENTS

| | | | | |
|---|---|---|---|---|
| 9,668,197 | B2* | 5/2017 | Zhang | H04W 36/302 |
| 11,223,667 | B2* | 1/2022 | Magzimof | H04L 65/61 |
| 11,799,936 | B2* | 10/2023 | Magzimof | H04L 65/61 |
| 2012/0231827 | A1* | 9/2012 | Oroskar | H04W 48/20 |
| | | | | 455/509 |
| 2020/0008083 | A1* | 1/2020 | Lei | H04W 24/04 |
| 2021/0266999 | A1* | 8/2021 | Laselva | H04W 36/14 |

FOREIGN PATENT DOCUMENTS

| | | | | |
|---|---|---|---|---|
| CN | 111198716 A | * | 5/2020 | ............... H05K 7/02 |
| CN | 113228714 A | * | 8/2021 | ......... G01C 21/3415 |

* cited by examiner

*Primary Examiner* — Yuri Kan
(74) *Attorney, Agent, or Firm* — Lee & Hayes, P.C.

(57) ABSTRACT

A vehicle can connect to multiple networks and multiple frequency bands and can determine network parameters (e.g., available bandwidth, throughput, latency, signal strength, etc.) associated with the multiple networks. Additionally, the vehicle can access network map data associated with the multiple networks. As the vehicle traverses an environment, the vehicle can collect sensor data of the environment and/or vehicle data (e.g., vehicle pose, diagnostic data, etc.). Based on the vehicle location and the network map data, the vehicle can optimize the use of networks and frequency bands to determine portions of the sensor data and/or vehicle data to transmit via the one or more of the multiple networks and multiple frequency bands.

20 Claims, 8 Drawing Sheets

ADAPTIVE MULTI-NETWORK MULTI-BAND VEHICLE COMMUNICATIONS

BACKGROUND

A vehicle can connect to a network to transmit and receive data with a remote computing device. During operation of the vehicle, the network can experience degraded performance (such as congestion) based on the locations of cell towers in relation to the vehicle as it moves, resulting in a reduced network performance. The reduced network performance can lead to suboptimal performance of the vehicle's communication with, for example, the remote computing device which may, in some scenarios, result in unsafe operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
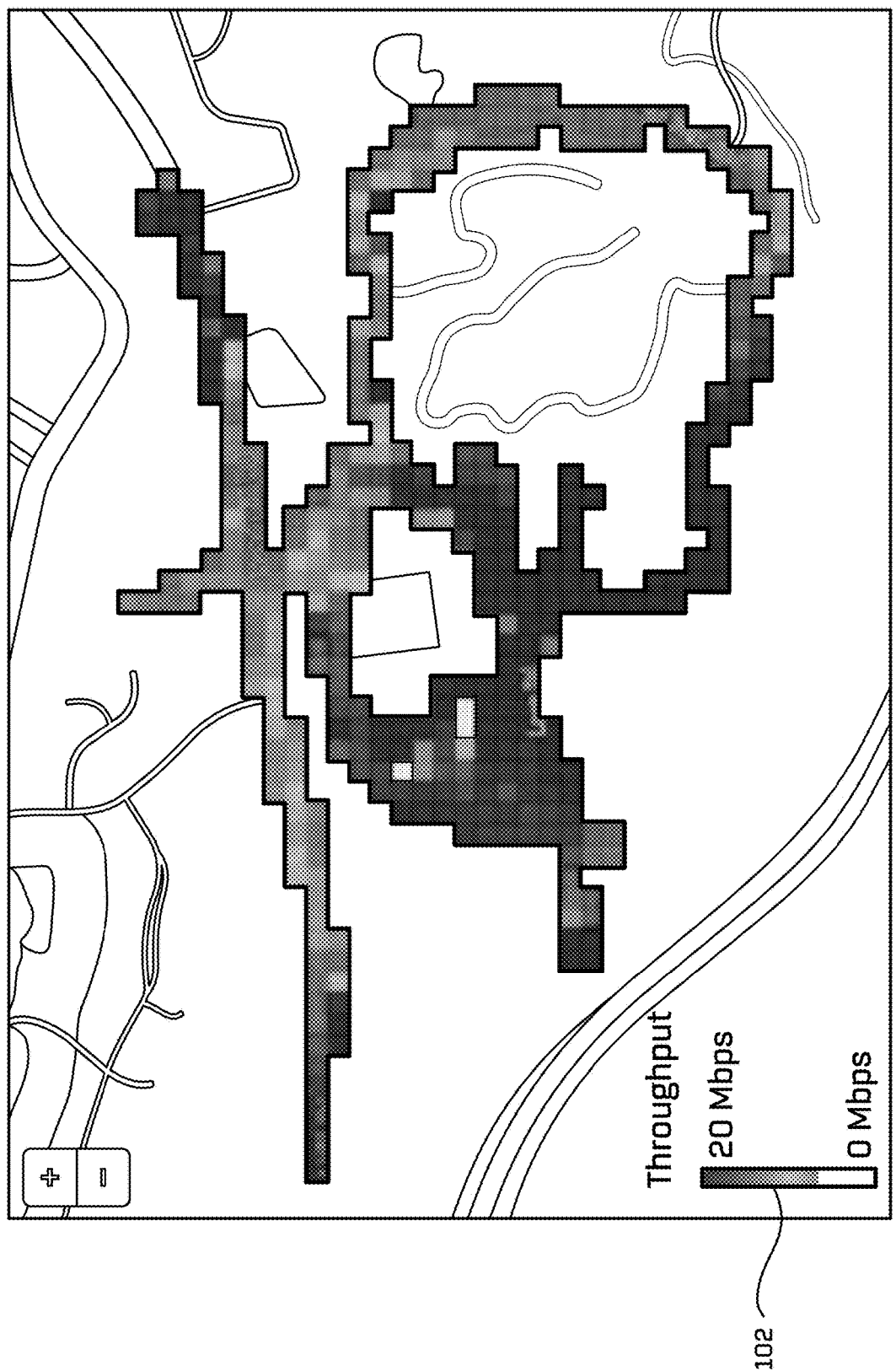
FIG. 1 depicts an example heat map of a geographical area showing network parameters in various regions.

Techniques for configuring a modem (such as a wireless modem) for transmitting data in a wireless network are discussed herein. In practice, as a system, such as a vehicle, enters a region (or an area) with network coverage, the network provider may automatically assign the vehicle frequency bands that have the best coverage. However, sometimes the frequency band determined by the network provider may not have the best performance (such as upload throughput) desired by the vehicle. As a non-limiting example, a carrier may optimize for coverage (which may indicate the geographical area within which service can be accessed and used by a device) while the vehicle may desire an optimization for throughput (which can indicate how much data is actually transferred from a source to a destination within a given time frame). Moreover, the performance of the frequency band with respect to one or more parameters may vary drastically as the vehicle enters various regions. As described herein, regions may include blocks, streets, communities, neighborhoods, districts, zone, cells, or any suitable geographic units.

This disclosure describes systems, methods, and apparatuses for adaptive multi-network multi-band vehicle communications. For example, a vehicle can receive map data representing preferred wireless network settings associated with regions in an environment. Any such region may be associated with a preferred wireless network and/or a preferred frequency band, as well as any other setting which may be altered with respect to the network communication. Upon the vehicle determines that it is within a particular region, the vehicle can send a message to a base station indicating the capability of its communication device (such as a wireless modem). For example, under Radio Resource Control (RRC) protocol, a base station can send an RRC reconfiguration message to the modem of the vehicle to establish or switch frequency bands. In response, the modem of the vehicle can complete the reconfiguration and send an RRC reconfiguration complete message to the base station.

The vehicle can connect to multiple networks via the communication device to transmit vehicle data captured and/or determined by the vehicle. In some examples, the vehicle can set the communication device (such as the wireless modem) to use the preferred wireless network based on the wireless network settings. For example, the vehicle can update a parameter associated with a Subscriber Identity Module (SIM) so as to set the modem. The vehicle data can include sensor data captured by a sensor of the vehicle, derivative data therefrom (e.g., object detections, predictions, etc.), diagnostic data of the vehicle (e.g., faults, status, etc.), and/or trajectory data indicating a trajectory of the vehicle.

Additionally, the vehicle can measure and/or determine network parameters (also referred to as network measurements, signal parameters, and/or network data) associated with the multiple networks in different regions (at a currently measured time and/or based on previous mapping). Such network parameters will be described in detail below but may comprise, for example, signal strength (which can indicate the strength of the signal associated with the network or the frequency band), signal to noise ratios (which can indicate a ratio of a level of a desired signal to a level of background noise), latency (which can indicate a delay in the transmission of data over the network or the frequency band), throughput (which can indicate a maximum rate at which information can be transferred), etc. Based on the network parameters in various regions, the vehicle can determine portions of the vehicle data to transmit in various regions while traversing a trajectory. Using the network parameters, the vehicle can prioritize and/or optimize the transmission of the vehicle data and anticipate the availability of the multiple networks and multiple frequency bands along the trajectory.

In some examples, the vehicle can predict network parameters in various regions. The prediction of network parameters may be implemented utilizing the techniques described in U.S. Pat. No. 11,042,153, filed Dec. 21, 2018, and entitled "Adaptive Multi-network Vehicle Architecture," the contents of which are incorporated herein by reference in its entirety and for all purposes. In some instances, the vehicle can determine, based at least in part on the trajectory, that the vehicle will enter a region with no network connectivity. In response, the vehicle can change/update the trajectory to avoid the region with no network connectivity, and instead, traverse another region which has at least one network connectivity.

In at least some examples, a vehicle can include multiple modems (also referred to as communication devices) capable of connecting to one or more networks and one or more frequency bands. For example, the vehicle can include a first modem capable of connecting to a first wireless network and a second modem capable of connecting to a second wireless network. In some instances, the first and second modems can be wireless modems. In some instances, the vehicle can include a single modem that can connect to both the first wireless network and the second wireless network. In some instances, the first wireless network can provide one or more frequency bands. In some instances, the second wireless network can provide one or more frequency bands which may differ, overlap, or otherwise be substantially similar to those associated with the first wireless network. In some instances, the first wireless network and the second wireless network can be associated with the same wireless network provider or different wireless network providers. In some instances, having access to multiple networks associated with different wireless providers can reduce the probability of traversing through a region that does not provide network availability due to varying network coverage. As such, safety can be improved if the vehicle has accessibility to multiple networks. Because when one network is unavailable in a region, the vehicle may switch to a different network that is available, such that data transmission between the vehicle and the remote computing device may not be cut off.

As the vehicle operates, it can capture and/or determine data associated with the vehicle (also referred to as vehicle data). For example, the vehicle data can include vehicle status data, vehicle diagnostic data, and vehicle metrics data. The vehicle status data can indicate that the vehicle is in an operating mode, a standby mode, and/or a fault mode, for example. The vehicle diagnostic data can indicate a battery status/charge data, vehicle log data (e.g., a data log including the operations that the vehicle has received and/or operations that the vehicle has executed), component statuses of individual components of the vehicle, and/or an occupancy of the vehicle, though any other diagnostic data is contemplated. The vehicle metrics data can include current and/or previous steering angle data and/or current and/or previous acceleration data.

In some instances, the vehicle data can include sensor data captured by one or more sensors where the sensor data is associated with an environment. The one or more sensors can include time-of-flight sensors, lidar sensors, radar sensors, sonar sensors, image sensors, audio sensors, infrared sensors, location sensors, etc., or any combination thereof, although other types of sensors are contemplated. The sensor data can be associated with objects such as buildings, trees, vehicles, and pedestrians. In some instances, the sensor data can be associated with road markers and/or road signs.

Using the sensor data, the vehicle can, using a vehicle computing device, determine a trajectory for the vehicle to follow and safely navigate the environment. For example, the trajectory can include a path along streets and/or roads where the vehicle has determined that it is safe for the vehicle to travel along. In some instances, the vehicle can determine a trajectory that includes pulling the vehicle over onto a shoulder or a side of a road to avoid obstacles on the road.

As the vehicle traverses the environment, the vehicle can transmit or prepare to transmit some or all of the vehicle data. For example, the vehicle can transmit vehicle data such as location data to a remote computing device to enable tracking of the vehicle. In some instances, the vehicle can transmit vehicle data such as image data captured by an image sensor of the vehicle to the remote computing device to monitor the vehicle's perspective of the environment. Additionally, or alternatively, the vehicle can also receive location dependent data for driving, such as map data for traversing a section of an environment and/or commands from the remote computing device.

As discussed herein, there can be an initial mapping stage (step zero) where the vehicle (or any other vehicle in a fleet of vehicles) may drive around and collect various network parameters (e.g., available frequency bands, delays, throughputs, etc.). Then, map data can be built based on the network parameters collected by the vehicle. The map data can indicate, for different regions in an environment, which wireless network (e.g., Verizon, T-Mobile, AT&T, and the like) is preferred, and which frequency band is preferable. Then, the modem of the vehicle can switch carriers (e.g., using an eSIM, active/backup physical SIM configuration) and/or frequency bands per region. In some embodiments, the modem of the vehicle can reboot to perform the switching or can change parameters via a configuration file or interface. As part of connecting to a base station, the modem can send a capability message to the base station indicating the capability of the modem. For example, the message can indicate that the modem is a 4G modem and can support frequencies 1, 2, and 3. The base station can receive the capability message from the modem and then send a response message back to the modem. For example, the base station may send a response message to the modem, indicating that the modem can use frequency 3. Additionally or alternatively, because the area has been pre-mapped, if the modem determines that frequency 2 has the best performance (e.g., best throughput, or the like), the modem can change the capability message to the base station. There may be different ways to measure the performance of a frequency band. For example, the performance of the frequency band can be measured in terms of bandwidth, throughput, latency, jitter variation, error rate, or the like. In some examples, a frequency band with the best performance may refer to a frequency band that has the broadest bandwidth, highest throughput, shortest latency, lowest jitter variation, or lowest error rate. For example, the capability message can indicate that the modem is a 4G modem and only supports frequency 2. Accordingly, because the base station gets the information that the modem only supports frequency 2, the base station will assign frequency 2 resources to the modem.

In some examples, the modem can convey modem capabilities to the base station via an RRC protocol or an RRC configuration message. In some examples, the modem capability information can be provided in connection with a Non-Access Stratum (NAS) message (e.g., an attach request), and in some examples, the base station can send a UECapabilityEnquiry message to the modem and the modem can respond with a UECapability Information message.

After establishing connections to a proper wireless network and proper frequency band, the vehicle can configure different queues and push data to the different queues at least based on a data type, a size of the first queue, a size of the second queue, and a data priority. For example, the vehicle computing device can associate a priority level for the vehicle data associated with the vehicle diagnostic data that is higher than a priority level associated with the image data. In some instances, the priority can be fixed based on the type of vehicle data such that a pose type of vehicle data always has a higher priority than a diagnostic type of vehicle data. In some instances, the priority can be dynamic based on the vehicle data and/or the network parameters. More details regarding the data priority are described in U.S. Pat. No. 11,042,153, filed Dec. 21, 2018, and entitled "Adaptive Multi-network Vehicle Architecture," the contents of which are incorporated herein by reference in its entirety and for all purposes.

In some instances, the vehicle computing device can push data into queues based on the throughput capacity of the frequency band available at the time. In some examples, the vehicle computing device can change the data amount (upload throughput) to transmit in the queues on the fly based on regions. For example, when the throughput capacity of the frequency band increases, the vehicle computing device can make the data amount of the queue (size of the queue) to transmit bigger within some time. As such, the vehicle computing device can optimize the upload throughput performance per region.

The vehicle computing device can access network map data, which may include geographic data, graphic data, text data, and the like. The vehicle computing device can access network map data to determine network parameters associated with the vehicle's current region and other regions. For example, the vehicle can, prior to traversing an environment, store the network map data at the vehicle computing device or in a storage accessible to the vehicle computing device. In some instances, the vehicle can receive the network map data as it traverses the environment and/or receive network map data updates as it traverses the environment.

In some examples, the network map data can be represented as heat map data. For example, the heat map data may represent throughput performances of frequency bands per discretized region or area. As an example, different colors in the heat map may be associated with different throughputs of the frequency bands. As another example, different throughputs of the frequency bands may be encoded in the discretized regions/areas. In some examples, the network map may include individual heat maps for individual frequency bands, wireless networks, and the like. In some examples, a network map may be represented as a look-up table with regions and preferred network settings.

In some examples, the vehicle computing device can automatically measure the instantaneous network parameters associated with the networks as the vehicle traverses different regions. For example, the vehicle computing device can take a sample every second (or any configurable time period or regular or irregular intervals) to measure the band parameters. In some examples, when the vehicle computing device is transmitting the data via a first modem over a first wireless network, the vehicle computing device can still use a second modem to sample the network parameters and band parameters associated with a second wireless network. In some instances, the vehicle can transmit the measured network parameters and measured band parameters to a remote computing device and the remote computing device can use the measured network parameters measured band parameters to update the network map data. In some examples, the network map data can be saved in a data storage on a cloud platform. In some examples, the network map data can be provided (with or without charge) for other parties to use.

The vehicle computing device can determine a cellular setting associated with a trajectory of the vehicle by determining which network is preferred and which frequency bands are preferred per region in an environment along the trajectory of the vehicle based on the network map data, before the vehicle transverse the trajectory. The vehicle computing device can save the cellular setting (e.g., in the form of a file) on a server. In some examples, the vehicle computing device can update the cellular settings in the database as the network parameters change. In some examples, the vehicle computing device can switch networks and/or frequency bands based on the saved cellular setting as the vehicle traverses different regions along the trajectory.

The vehicle computing device can make sure that the vehicle computing device always has at least one network and at least one frequency band to connect to. For example, the vehicle computing device can determine that no network (or otherwise insufficient network communication) is available at a particular region along the trajectory of the vehicle. Then, the vehicle computing device can adjust the trajectory of the vehicle such that the vehicle does not go through the particular region without network coverage, and reroute the trajectory of the vehicle such that each region of the new trajectory will have at least one network having sufficient coverage.

Based on the network map data, the vehicle computing device can prepare and prioritize the vehicle data for transmission. For example, the vehicle map data can indicate that an upcoming region along the vehicle's trajectory provides low network performance. In response, the vehicle computing device can transmit the vehicle data associated with a higher priority level. In a similar example, where the connectivity of one provider is degraded in an area, the vehicle computing device may bias data to be sent out on other networks. By way of another example, the vehicle computing device can downgrade a resolution of data to be sent or otherwise limit the amount of data to be transmitted prior to entering a region with reduced network performance and/or frequency throughput. Additionally, in some instances, the vehicle computing device can change the trajectory of the vehicle to avoid a region without network availability.

The vehicle computing device can prioritize the data to transmit. For example, the vehicle computing device can associate high priority data with a high performance frequency band and associate low priority data with a low performance frequency band. In some examples, the vehicle computing device can associate high priority data (such as emergency data) with a dedicated frequency band and/or a dedicated network. In some examples, the vehicle computing device can transmit the high priority data (such as emergency data) to a base station together with an indication that the data is important.

In some instances, the vehicle computing device can determine portions of vehicle data and assign a priority level with the portions of the vehicle data based on the network parameters. For example, the vehicle computing device can associate a priority level for the vehicle data associated with the vehicle diagnostic data that is higher than a priority level associated with the image data. In some instances, the priority can be fixed based on the type of vehicle data such that a pose type of vehicle data always has a higher priority than a diagnostic type of vehicle data. In some instances, the priority can be dynamic based on the vehicle data and/or the network parameters. In some instances, the vehicle can have a default priority scheme associated with types of vehicle data and a dynamic priority scheme based on the vehicle data, the network parameters, and/or instructions from a remote computing device. In some examples, such prioritization may be context dependent. As a non-limiting example, during nominal operations of such a vehicle, the vehicle diagnostic data may have a higher priority over other data types. However, when engaging with a remote computing device for guidance, image data may take higher priority.

Based on the network parameters and/or priorities, the vehicle can prepare the vehicle data for transmission. For example, the vehicle can prepare a first portion of the vehicle data to be transmitted over a first network and a second portion of the vehicle data to be transmitted over a second network. For example, the network parameters can indicate that the first network has more bandwidth available (or lower latency, higher signal strength, higher throughput, and the like) than the second network. In response, the vehicle computing device can determine to transmit vehicle data having a higher priority using the first network and determine to transmit vehicle data having a lower priority using the second network. For example, the network parameters can indicate that the first frequency band has more throughput available (or lower latency, higher signal strength, and the like) than other frequency bands provided by the first network. In response, the vehicle computing device can determine to transmit vehicle data having a higher priority using the first network and determine to transmit vehicle data having a lower priority using the second network.

In some examples, a fleet of vehicles may be in communication with the remote computing device. In some examples, different vehicles in the fleet can be divided to connect to different networks and/or different frequency bands when the vehicles are within the same area to avoid network congestion.

Additionally, the techniques discussed herein can improve a functioning of a computing device by increasing the ability for the computing device to maintain a connection to one or more frequency bands associated with one or more networks and/or improve the connection to the one or more frequency bands associated with the one or more networks. For example, a computing device associated with a vehicle can determine that a first network is unavailable but that a second network is available. Then, the computing device can transmit prioritized data using the second network to ensure an uninterrupted communication with a remote computing device. In some instances, the computing device can determine that a first network is associated with a lower latency and/or a higher bandwidth than the second network and can transmit data using the first network for higher priority data. As another example, the computing device associated with the vehicle can determine that among available frequency bands provided by the first network, a first frequency band and a second frequency band have the optimal performance (e.g., optimal throughput). The computing device can communicate with a base station associated with the first network, indicating that the computing device has the capability of using the first frequency band and the second frequency band. In response, the base station associated with the first network may assign the computing device one of the first frequency band and the second frequency band, for example, the first frequency band. Then, the computing device can determine a data rate associated with the first frequency band, and transmit prioritized data via the first frequency band based on the data rate.

Therefore, the functioning of a computing device can be increased by increasing the computing device's ability to maintain a consistent connection and/or improving the data transfer performance of the computing device. As can be understood, maintaining and/or improving a network connection with a vehicle can improve safety outcomes and can improve ride quality by quickly resolving issues remotely, particularly in the context of autonomous vehicles. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems sending wireless data, and are not limited to autonomous vehicles. In another example, the systems, methods, and apparatuses can be used in an aviation or in a nautical context. Additionally, the techniques described herein can be used with real data (e.g., captured using sensor(s)), simulated data (e.g., generated by a simulator), or any combination of the two.

FIG. 1 depicts an example heat map 100. As described above, there can be an initial mapping stage where a vehicle (or vehicles in a fleet) may drive around and collect various network parameters (e.g., for each wireless network and/or available frequency band(s), delays, throughputs, etc.). Then, the map data can be built based on the network parameters collected by the vehicle. The map data can indicate, for different regions in an environment, which wireless network (e.g., Verizon, T-Mobile, AT&T, and the like), and which frequency band is preferable. In some examples, the network map data can include heat map data or other data representation, such as a look-up table. In FIG. 1, the heat map 100 may represent throughput performances of frequency bands in grayscales at different regions. As shown in the heat map 100, the gray scales may be associated with different throughputs of the frequency bands. For example, the greyscale bar 102 shows that the darkest greyscale may be associated with a throughput of 20 Mbps or more, and the lightest greyscale may be associated with a throughput of 0 Mbps or less.

In some examples, the heat map 100 may include an average of data collected over a period, such as several days, several weeks, several months, and the like. In some examples, the network parameters may vary over the course of a day of week, day of the year (or month of the year). In some examples, a server can store various heat maps for various times. In some examples, a fleet of vehicles can contribute to data collection for generating the heat map 100. In some instances, each vehicle of the fleet can measure the network parameters associated with various networks as the vehicle traverses an environment. Such measured network parameters can be incorporated into the heat map data to update the heat map 100. In some instances, the heat map 100 can be stored in a remote computing device. In some instances, the heat map 100 can be stored in a memory of the vehicle.

As described herein, the heat map 100 can be used by a vehicle to optimize a cellular setting. For example, the vehicle can determine which network to connect to and which frequency bands to report to the base station at each region along a trajectory of the vehicle based at least in part on the heat map data. In some instances, the vehicle can receive the heat map data as it traverses the environment and/or receive heat map data updates as it traverses the environment. The remote computing device can provide the heat map data prior to the vehicle operating in the environment and/or provide network map updates to the vehicle as the vehicle traverse the environment.

Figure 2:
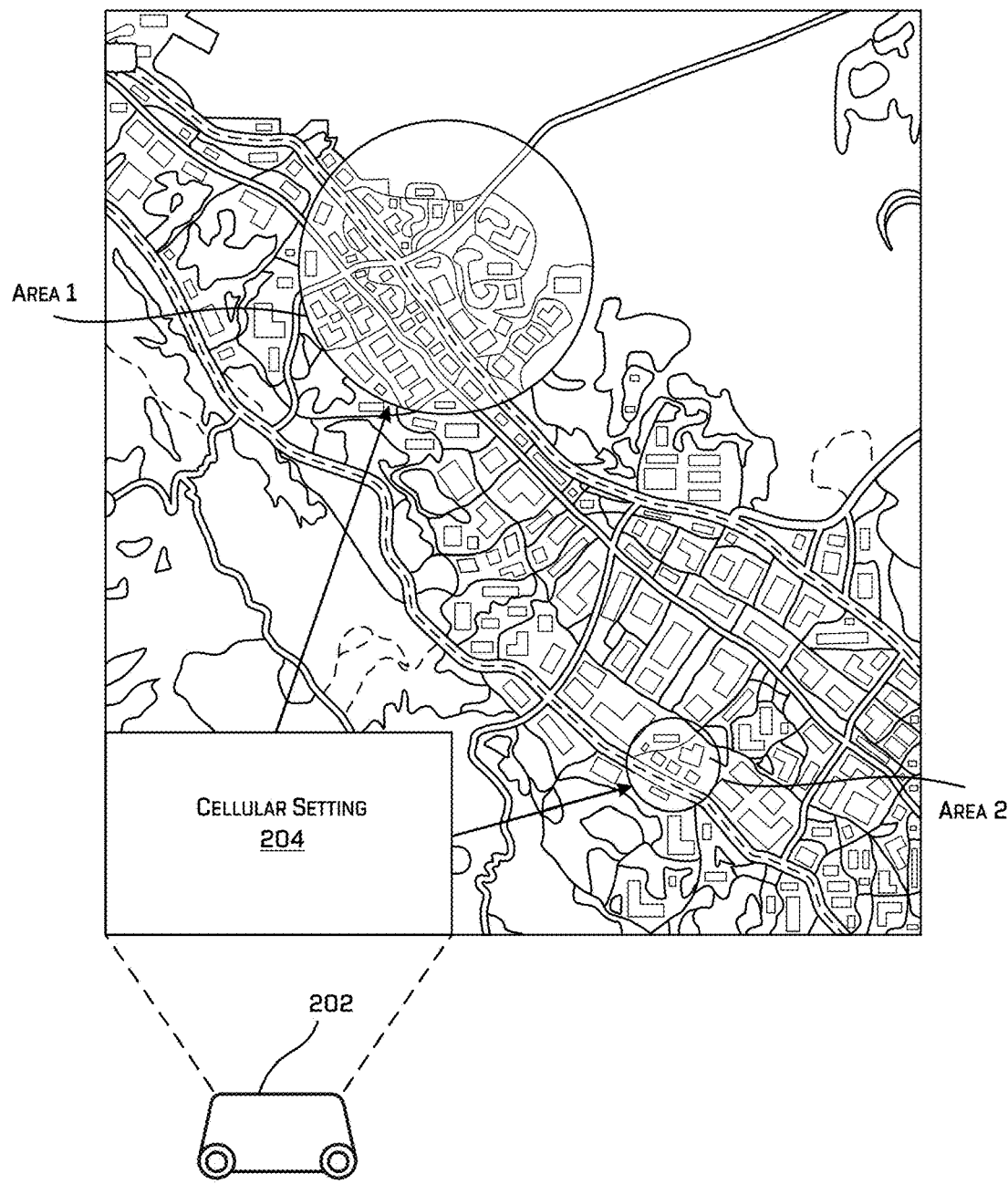
FIG. 2 depicts an example scenario where a vehicle can have a cellular setting.

FIG. 2 depicts an example scenario 200 where a vehicle 202 can have a cellular setting 204. As described herein, the vehicle 202 can determine the cellular setting 204 associated with a trajectory of the vehicle 202 by determining which network to connect to and which frequency bands to report to the base station at each region along the trajectory of the vehicle based on network parameters, before the vehicle transverse the trajectory. In some examples, the vehicle 202 can save the cellular setting (e.g., in the form of a file, a lookup table, and so on) in a database, a server, cloud storage, or the like. In some examples, the vehicle 202 can continuously measure the network parameters (also referred to as network measurements, signal parameters, and/or network data) associated with the multiple networks in different regions and update the map data in the database. As described herein, regions may include blocks, streets, communities, neighborhoods, districts, zone, areas, regions, cells, or any suitable geographic units.

For example, as shown in scenario 200, the cellular setting 204 may indicate that within area 1, a first network is preferred (i.e., has the best performance), and a first frequency band and a second frequency band provided by the first network are preferred (i.e., have the best performance). For example, the cellular setting 204 may indicate that within area 2, the second network is preferred is preferred (i.e., has the best performance), and a third frequency band and a fourth frequency band provided by the second network are preferred (i.e., has the best performance). In some examples, vehicle 202 can switch networks and/or frequency bands based on the saved cellular setting 204 as the vehicle 202 traverses different regions along the trajectory.

Figure 3:
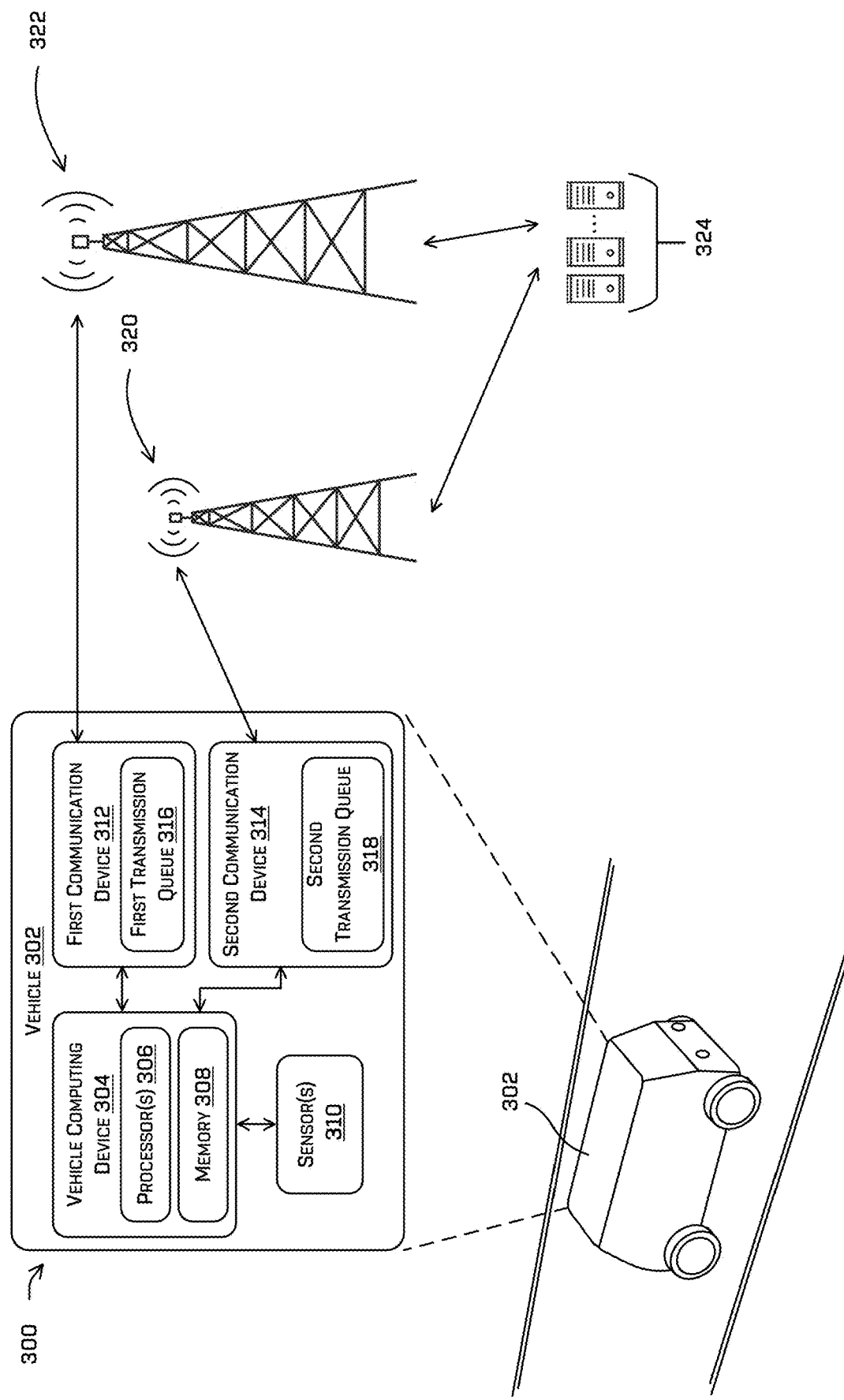
FIG. 3 depicts an example block diagram of a vehicle traversing through an environment while in communication with a remote computing device.

FIG. 3 illustrates an example environment 300 through which an example vehicle 302 is traveling. The example vehicle 302 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 can be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 302 can be any configuration of vehicle, such as a van, a sport utility vehicle, a cross-over vehicle, a truck, a bus, an agricultural vehicle, and/or a construction vehicle. The vehicle 302 can be powered by one or more internal combustion engines, one or more electric motors, hydrogen power, any combination thereof, and/or any other suitable power sources. Although the example vehicle 302 has four wheels, the systems and methods described herein can be incorporated into vehicles having fewer or a greater number of wheels, tires, and/or tracks. The example vehicle 302 can have four-wheel steering and can operate generally with equal or similar performance characteristics in all directions, for example, such that a first end of the vehicle 302 is the front end of the vehicle 302 when traveling in a first direction, and such that the first end becomes the rear end of the vehicle 302 when traveling in the opposite direction. Similarly, a second end of the vehicle 302 is the front end of the vehicle when traveling in the second direction, and such that the second end becomes the rear end of the vehicle 302 when traveling in the opposite direction. These example characteristics may facilitate greater maneuverability, for example, in small spaces or crowded environments, such as parking lots and/or urban areas.

As discussed above, the vehicle 302 can include a vehicle computing device 304. The vehicle computing device 304 can include one or more processors 306 and memory 308 communicatively coupled to the one or more processors 306. The one or more processors 306 can include, for example, one or more FPGAs, SoCs, ASICs, and/or CPUs. The vehicle 302 can be used to travel through the environment 300 and determine and/or capture data. For example, the vehicle computing device 304 can determine vehicle status data, vehicle diagnostic data, and/or vehicle metrics data. In some instances, the vehicle 302 can include one or more sensors 310 where the one or more sensors 310 can include one or more time-of-flight sensors, lidar sensors, radar sensors, sonar sensors, image sensors, audio sensors, infrared sensors, location sensors, wheel encoders, IMUs, etc., or any combination thereof, although other types of sensors are contemplated.

As the vehicle 302 travels through the environment 300, the sensors 310 can capture sensor data associated with the environment 300. For example, some of the sensor data can be associated with objects (e.g., trees, vehicles, and/or pedestrians). In some instances, the sensor data can be associated with other objects including, but not limited to, buildings, road surfaces, signage, barriers, etc. In some instances, the vehicle computing device 304 can determine information about objects in the environment, such as bounding boxes, classifications, segmentation information, and the like.

The vehicle computing device 304 can use the sensor data to generate a trajectory for the vehicle 302. In some instances, the vehicle computing device 304 can also determine pose data associated with a position of the vehicle 302. For example, the vehicle computing device 304 can use the sensor data to determine position data, coordinate data, and/or orientation data of the vehicle 302 in the environment 300. In some instances, the pose data can include x-y-z coordinates and/or can include pitch, roll, and yaw data associated with the vehicle 302.

The vehicle computing device 304 can be communicatively coupled to a first communication device 312 (also referred to as a first modem or a first communication connection) and a second communication device 314 (also referred to as a second modem or a second communication connection). The first communication device 312 can be associated with a first transmission queue 316 and the second communication device 314 can be associated with a second transmission queue 318. Using one or both of the first communication device 312 and the second communication device 314, the vehicle computing device 304 can connect to a first network and/or a second network via a first communication tower 320 (also referred to as a first base station) and/or a second communication tower 322 (also referred to as a second base station). For example, the first communication tower 320 can be associated with a first network that is supported by the first communication device 312 and the second communication tower 322 can be associated with a second network that is supported by the second communication device 314. Accordingly, this dual modem architecture can allow the vehicle computing device 304 to communicate using either of the first network or the second network.

In some instances, the first communication device 312 and the second communication device 314 can be substantially similar and can both connect to either the first network and/or the second network. In some instances, the first network and the second network can be associated with the same network provider and/or network operator. In some instances, the first network and the second network can be associated with different network providers and/or network operators.

In some instances, the vehicle computing device 304 can determine which wireless network (e.g., Verizon, T-Mobile, AT&T, and the like) is preferred, and which frequency band is preferable based on the cellular setting saved in the database. The vehicle computing device 304 can send a first capacity message to the first communication tower 320 via the first communication device 312 based on the determination. For example, the first capacity message can indicate that the first communication device 312 is a 4G modem and can support frequencies 1, 2, and 3 associated with the first network. The first communication tower 320 can receive the first capability message from the first communication device 312 and get that the first communication device 312 is a 4G modem and can support frequencies 1, 2, and 3. Then, the first communication tower 320 can send a first response message back to the first communication device 312. For example, the first response message can indicate that the first communication device 312 can use frequency 3 (or frequency 1 or 2). For example, the first frequency band can have a throughput of 20 megabits per second (Mbps). In response, the vehicle computing device 304 can maximize the benefit of the 20 Mbps throughput of the first frequency band while the vehicle 302 is traversing a region in which the first frequency band is available.

As described herein, the vehicle computing device 304 can determine which wireless network (e.g., Verizon, T-Mobile, AT&T, and the like) is preferred, and which frequency band is preferable based on the cellular setting saved in the database. Then, the vehicle computing device 304 can send a second capacity message to the second communication tower 322 via the second communication device 314 based on the determination. For example, second capacity message can indicate that the second communication device 314 is a 4G modem and can support frequencies 4 and 5 associated with the second network. The second communication tower 322 can receive the second capability message from the second communication device 314 and get that the second communication device 314 is a 4G modem and can support frequencies 4 and 5. Then, the second communication tower 322 can send a second response message back to the second communication device 314. For example, the second response message can indicate that the second communication device 314 can use frequency 4 (or frequency 5).

In some instances, vehicle computing device 304 can switch frequency bands and/or networks per region. Additional details are provided with respect to FIGS. 4A-4C. It should be noted that as the vehicle 302 traverses different regions and switches between different networks and/or frequency bands, the vehicle computing device 304 always has at least one network to connect to. In other words, the vehicle computing device 304 never goes dark.

In some instances, the vehicle 302 can transmit data via the first network and the second network together. In some examples, in a region where the first network and the second network are both available, the vehicle 302 can transmit data with higher priority via a first network with higher performance and transmit data with lower priority via a second network with a lower performance. For example, the vehicle 302 can put a first portion of the data with a higher priority in the first transmission queue 316, and put a second portion of the data with a lower priority in the second transmission queue 318.

As the vehicle 302 operates, it can transmit the vehicle data or a portion of the vehicle data to a remote computing device 324. For example, the vehicle can transmit vehicle data such as region data to the remote computing device 324 to enable tracking of the vehicle. In some instances, the remote computing device 324 can include a server that stores network map data and/or cellular setting data in a database. In some instances, the remote computing device 324 can be operated by a person.

The remote computing device 324 can be configured to provide network map data and/or cellular setting data to the vehicle 302. In some examples, the network map data may be tags, or otherwise additional information, associated with a map otherwise used for localization as described with respect to FIG. 5. In some examples, the network map data may include geographic data, graphic data, text data, lookup tables, and the like. In some examples, the network map data can include heat map data as described with respect to FIG. 1. In some examples, the cellular setting data can indicate which network is preferred and which frequency bands are preferred per region in an environment. In some examples, the cellular setting data can include the cellular setting as described with respect to FIG. 2.

For example, the vehicle 302 can, prior to traversing an environment, access and store the network map data at the vehicle 302 computing device or in a storage accessible to the vehicle 302 computing device. In some instances, the vehicle 302 can receive the network map data as it traverses the environment 300 and/or receive network map data updates as it traverses the environment 300. The remote computing device 324 can provide the network map data prior to the vehicle 302 operating in the environment 300 and/or be configured to provide network map updates as the vehicle 302 traverses the environment 300. In some instances, the vehicle 302 can measure and/or record network parameters determined by the vehicle 302 as it traverses the environment 300 and transmits the measured network parameters to the remote computing device 324.

In some instances, the vehicle can use a parameter index (e.g., a time parameter, an event parameter, a location parameter, a weather parameter, and the like) to select a portion of a network map (including network map data) or select a network map from a plurality of network maps (including network map data). In some examples, the network parameters may vary over the course of a day (and/or based on a time of year). For example, a first optimal setting at 1 PM (determined using a 1 PM map) may differ from an optimal setting at 3 PM (determined using a 3 PM map). For example, the vehicle can approach a region at 3 PM while connected to a first network associated with a first network provider and a second network associated with a second network provider. The vehicle can then access, for example, a database of network maps. The vehicle can use the network provider as a parameter index and access the network maps associated with the first network provider. Then, the vehicle can use the region as a parameter index and access the network maps associated with the first network provider in the region. Subsequently, the vehicle can use the time of day as 3 PM to access the network maps associated with the first network provider in the region and associated with the 3 PM time of day. The vehicle can then perform similar operations to access the network maps associated with the second network provider using similar or different parameter indices.

In some instances, the network map data can include weather data (e.g., various maps for one or more of seasons, rain, sleet, sunshine, snow, etc. which may impact network connectivity). In some instances, the network map data can include event data associating the network parameters with an event. For example, the network map data can indicate an available bandwidth at a particular region as 50 Mbps at a first time and an available bandwidth at the particular region as 5 Mbps at a second time where the second time coincided with a concert event. Regardless, a network map/network map data may be selected which corresponds to a time of day, region, weather, events, and the like (as may impact network connectivity and frequency band performance).

After establishing connections to a proper wireless network and proper frequency band, the vehicle 302 can configure different queues and push data to different queues at least based on a data type, a size of the first queue, a size of the second queue, and a data priority. In some instances, the vehicle computing device 304 can push data into queues based on the throughput capacity of the frequency band available at the time. As such, the vehicle computing device can optimize the upload throughput performance per region. Techniques for sending data to different queues based on a priority of data and/or based on network conditions for transmission are discussed in U.S. Pat. No. 11,042,153, titled "Adaptive Multi-Network Vehicle Architecture," the entirety of which is herein incorporated by reference in its entirety for all purposes.

Figure 4A:
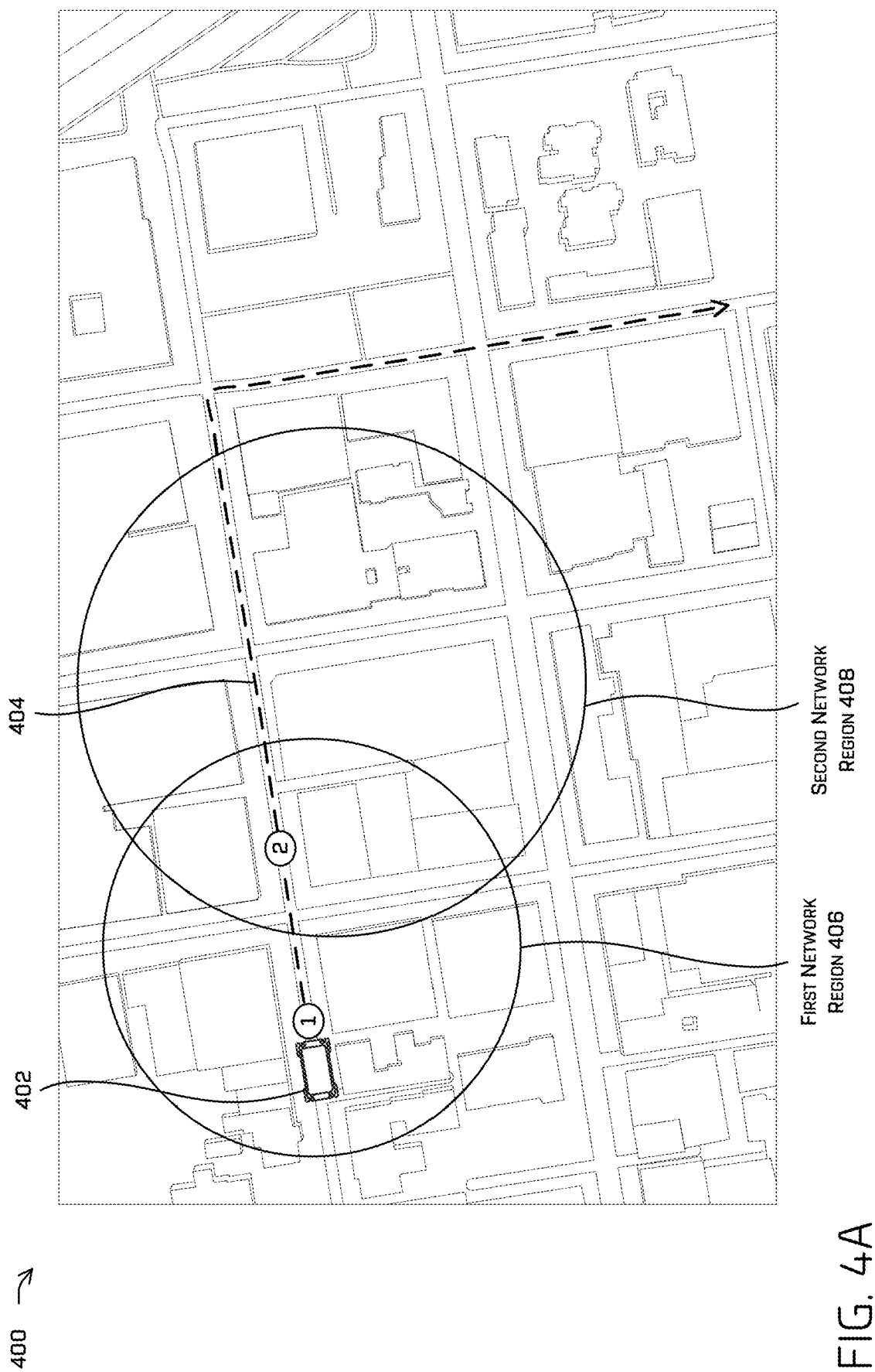
FIG. 4A, FIG. 4B, and FIG. 4C depicts example top views of an environment with a vehicle traversing an example trajectory.
Figure 4B:
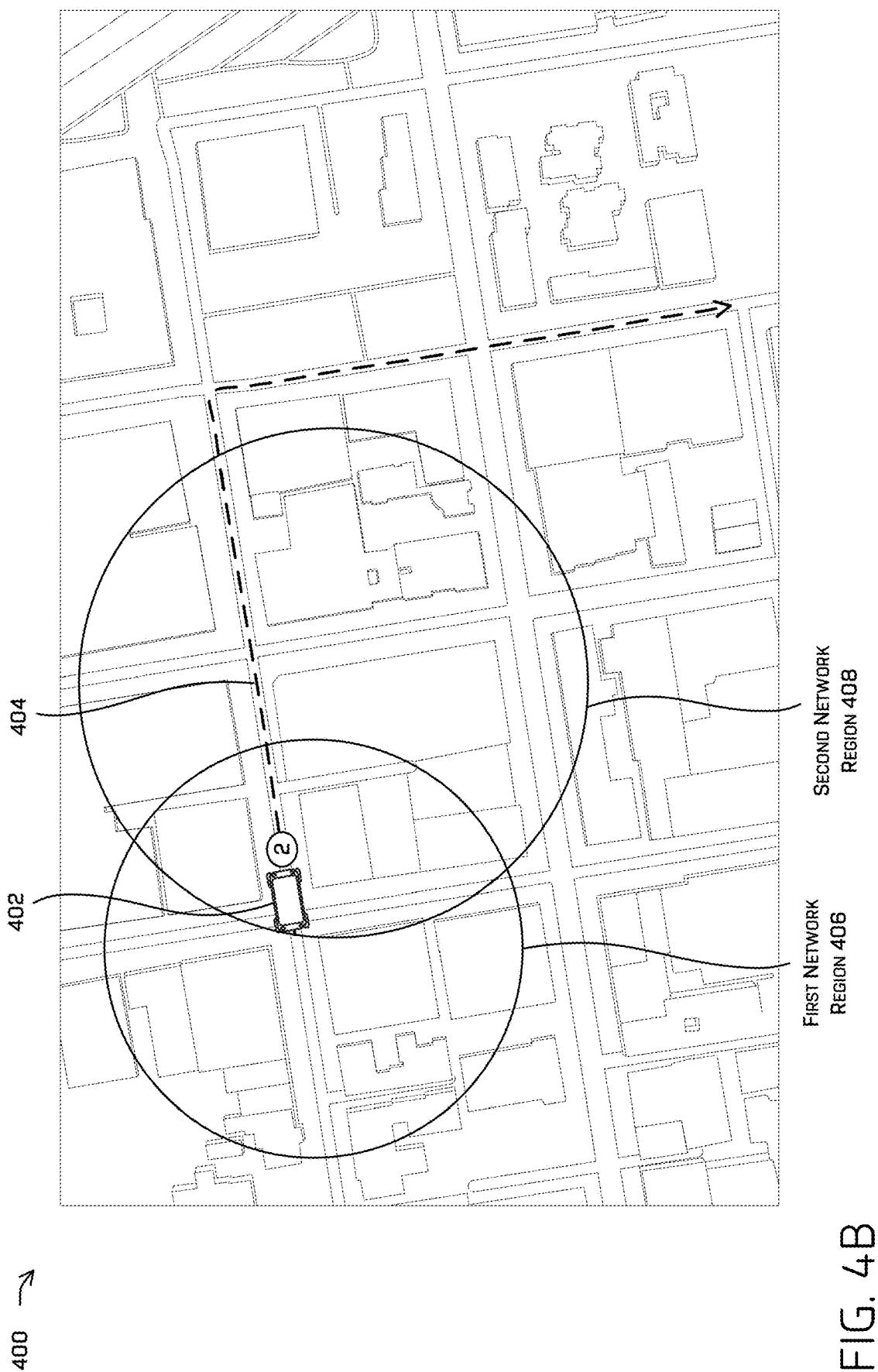
Figure 4C:
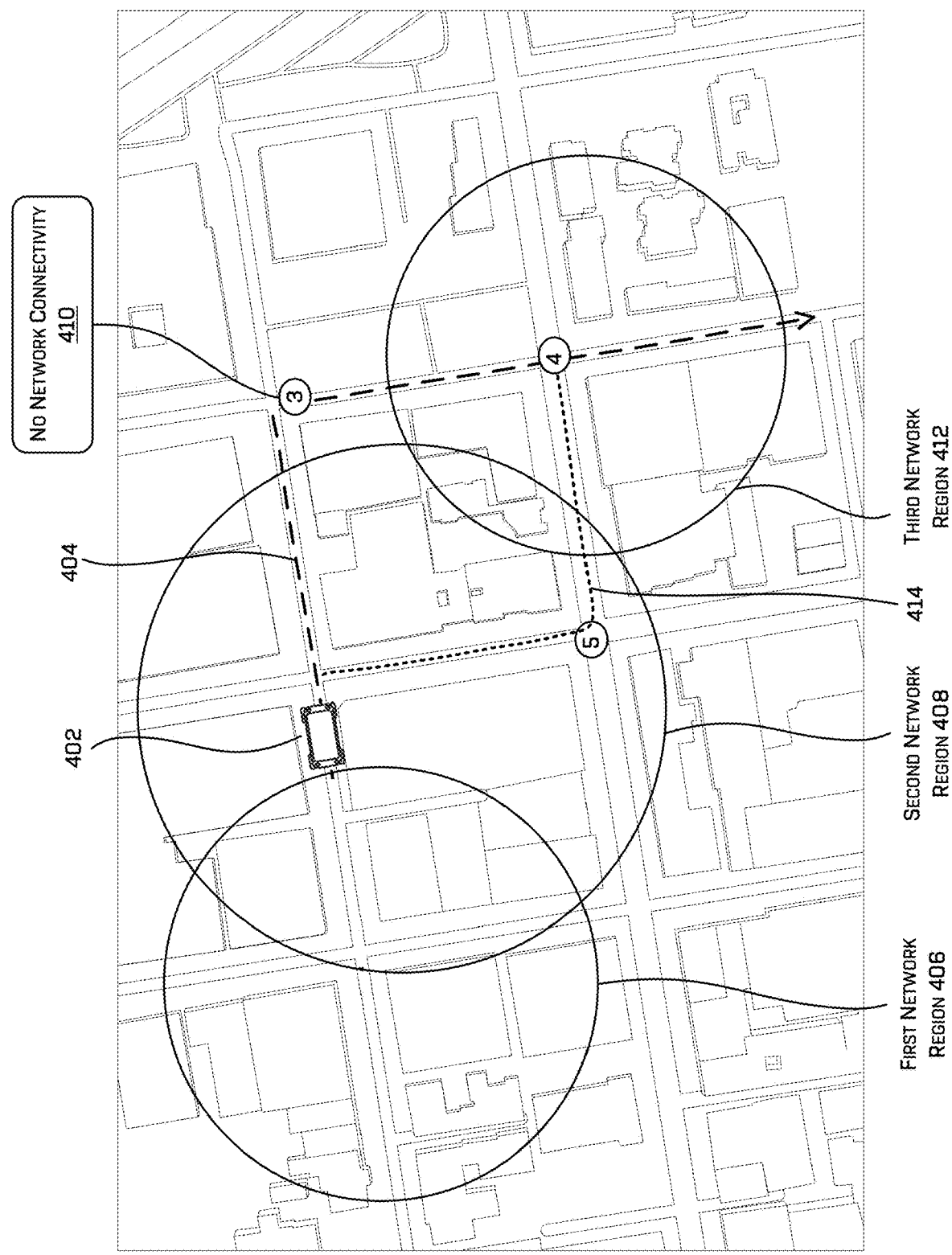

FIGS. 4A-4C illustrate an example environment 400 with example operations executed by the vehicle 402. Each operation can represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some figures include numbers such as ①, ②, ③, etc. This numbering is intended to orient a reader to one possible order of operations, but is not intended to be construed as a limitation, as discussed herein.

FIG. 4A illustrates an example environment 400 depicting a top view with a vehicle 402 traversing a trajectory 404. The vehicle 402 can be similar to the vehicle 202 described above with reference to FIG. 2 and the vehicle 302 described above with reference to FIG. 3. Before traversing the trajectory 404, the vehicle 402 can receive map data representing preferred wireless network settings associated with a plurality of regions of the environment 400. Each region of the plurality of regions can be associated with a preferred wireless network and a preferred frequency band. In some examples, the preferred wireless network settings maximize an upload throughput based on a wireless network and a frequency band for a particular region.

When traversing the trajectory 404, the vehicle 402 can determine that the vehicle 402 is at location ①. For purposes of illustration only, location ① can be serviced by the first network as depicted via first network region 406. The vehicle 402 can determine wireless network settings for a first modem, based at least in part on the vehicle being at location ①. In some examples, the preferred wireless network settings can maximize an upload throughput based on a wireless network and a frequency band for location ①. In some examples, the first modem can correspond to the first communication device 312 in FIG. 3. The vehicle 402 can set the first modem to use the preferred wireless network, based on the wireless network settings. The vehicle 402 can send a first modem capability message indicative of a first preferred frequency band to a first base station associated with the first wireless network. For example, the first capability message can include an indication of a frequency band subset that is less than the frequency bands that the first modem is configurable to use. Then, the vehicle 402 can receive a first response message from the first base station indicating that the vehicle 402 can use the first preferred frequency band.

Then, the vehicle 402 can receive sensor data from a sensor associated with the autonomous vehicle. The vehicle 402 can send data based on the sensor data to a remote computing device (not shown), via the first base station and the first preferred frequency band. In some examples, the remote computing device can correspond to the remote computing device 324 described with reference to FIG. 3.

After configuring a modem for a particular frequency band, if the performance of the frequency band is less than a threshold, the vehicle 402 can send a message to the base station indicating that the vehicle 402 has different capabilities (e.g., the vehicle supports other frequency bands). The threshold can be determined arbitrarily or based on rules. For example, the threshold can be 50 Mbps. When the throughput of the frequency band is less than 50 Mbps, the vehicle 402 can send a message to the base station indicating that the vehicle 402 can support one or more different frequency bands.

The vehicle 402 can select the frequency band for a second modem based on attributes associated with the first modem connection. For example, if the vehicle 402 determines that the frequency band used by the first modem has good bandwidth, the vehicle 402 can select a frequency band for the second modem with good latency, etc.

As discussed above, the vehicle 402 can access network map data indicating network parameters associated with one or more networks in various regions of the environment 400 to determine the preferred wireless network settings. In some instances, the network map data can include bandwidth data, signal strength (or field strength) data, signal-to-noise ratio data, throughput data, time data, latency data, jitter data, error rate data, and/or location data.

The bandwidth data can indicate a maximum rate at which information can be transferred. In some instances, the bandwidth data can be measured in a data rate such as bits per second (bps). In some instances, the bandwidth data can indicate a measured data rate (e.g., instantaneously measured and/or based on mapped data, as discussed herein). For example, the vehicle 402 can transmit a steady stream of data where the maximum bandwidth indicates a data rate of 100 Mbps. However, the vehicle 402 can determine that the measured data rate is 50 Mbps. Therefore, the bandwidth data can indicate a maximum data rate of 100 Mbps and a measured data rate of 50 Mbps.

The signal strength data can indicate the strength of the signal associated with the network or the frequency band. In some examples, the signal strength can be measured in decibels-milliwatts, arbitrary strength units, reference signals received power (RSRP), and/or reference signals received quality (RSRQ).

The signal-to-noise ratio (SNR) data can indicate a ratio of a level of a desired signal to a level of background noise. SNR is defined as the ratio of signal power to noise power, often expressed in decibels (dB).

The throughput data can indicate how much data can be transferred from the source to the destination within a given time frame. The throughput data is different from the bandwidth data because bandwidth is the term used for the maximum transfer capacity of a network, while throughput can indicate the amount of data that can be sent and received within a specific timeframe. In some examples, the throughput data can indicate the actual amount of data that can be transferred through a frequency band or a network.

The time data can indicate a time of day, a day of week, day of the year (or month of the year), and the like associated with the network parameters.

The latency data can indicate a delay in the transmission of data over the network or the frequency band. For example, the latency can indicate the amount of time between the vehicle 402 transmitting vehicle data and a remote computing device receiving the vehicle data.

The jitter data can indicate a variation in the time delay between when a signal is transmitted and when it is received over a network connection.

The error rate data can indicate a rate and/or percentage of data that is lost, dropped, incorrect, or corrupted compared to the data that is transmitted and received correctly.

The location data can indicate the location of the vehicle 402 in the environment 400.

In some instances, the vehicle 402 can determine the preferred wireless network settings (also referred to as cellular settings) associated with the trajectory 404 of the vehicle 402 beforehand. In some instances, the preferred wireless network settings can indicate which network to connect to and which frequency bands to report to the base station in each region along the trajectory 404 of the vehicle 402 based on the map data, before the vehicle 402 transverses the trajectory 404. The vehicle 402 can save the preferred wireless network settings (e.g., in the form of a file, a lookup table, and the like) in a database. In some examples, the vehicle 402 can switch networks and/or frequency bands based on the saved preferred wireless network settings as the vehicle 402 traverses different regions along the trajectory 404. In some examples, the vehicle 402 can continuously measure the network parameters (also referred to as network measurements, signal parameters, and/or network data) associated with the multiple networks in different regions and update the map data in the database as the vehicle 402 traverses different regions along the trajectory 404.

In any of the above examples, the premeasured data from the network map data (bandwidth, latency, error rate, etc.) can be used to preemptively determine which data topics (e.g., types/amounts of vehicle data) to transmit over which networks whereas the measured (or instantaneous) data, such as described above, may be used to further modify the topics, amounts of data, or the like transmitted over the multiple networks.

In some instances, the network map data can include event data associating the network parameters with an event. In some instances, the vehicle 402 can determine the network settings based on current or upcoming events. For purposes of illustration only, the network map data can indicate a drop of 50% in available bandwidth when a sporting event occurs in a particular region. The vehicle 402 can get prepared before traversing such a particular region during the sporting event. For example, the vehicle 402 can transmit all or a significant portion of the vehicle data that is above a particular priority level prior to entering the particular region. The vehicle 402 can delete, discard, or otherwise remove portions of the data in the transmission queue and can optimize the data transmitted once the vehicle 402 enters a region that provides better network performance.

Referring to FIG. 4B, when traversing the trajectory 404, the vehicle 402 can determine that the vehicle 402 is at location ②. For purposes of illustration only, location ② can be serviced by the first network as depicted by the first network region 406 and the second network as depicted by the second network region 408. The vehicle 402 can determine that the first modem is associated with a communication. The vehicle 402 can determine wireless network settings for a second modem based at least in part on the first modem being associated with the communication and the vehicle 402 being at the location ②. In some examples, the second modem can correspond to the second communication device 314 in FIG. 3. In some examples, the preferred wireless network settings can maximize an upload throughput based on a wireless network and a frequency band for location ②. The vehicle 402 can set the second modem to use the preferred wireless network based on the wireless network settings. For example, the vehicle 402 can update a parameter associated with a SIM so as to set the second modem. In some examples, the first modem is associated with the first wireless network, and the second modem is associated with the second wireless network. The first and the second wireless networks can be provided by the same or different carriers (e.g., Verizon, T-Mobile, AT&T, and so on). Then, the vehicle 402 can send a second capability message indicative of the preferred frequency band to a second base station associated with the second wireless network. For example, the second capability message can include an indication of a frequency band subset that is less than the frequency bands that the second modem is configurable to use. Then, the vehicle 402 can receive a second response message from the second base station indicating that the vehicle 402 can use the preferred frequency band.

After establishing connections to a proper wireless network and proper frequency band, the vehicle can configure different queues and push data to the different queues. In some examples, the vehicle 402 can put a portion of the data into a first queue associated with the first modem or a second queue associated with the second modem at least based on a data type, a size of the first queue, a size of the second queue, and a data priority. In some examples, the first queue can correspond to the first transmission queue 316 in FIG. 3, and the first queue can correspond to the second transmission queue 318 in FIG. 3. In some examples, at location ② where the first network and the second network are both available, the vehicle 402 can transmit data via the either the first network or the second network, or via the first network and the second network together.

The vehicle 402 can prioritize the data for transmission. For example, the vehicle 402 can determine that the data comprising the vehicle's pose data and diagnostic data have a higher priority than the image data, and can associate the pose data and the diagnostic data with a first transmission queue associated with the first network and place the image data in a later position in the first transmission queue. As another example, when the first network has a better performance than the second network (e.g., higher bandwidth, stronger signal, higher throughput, lower latency, and so on), the vehicle 402 can put a first portion of the data with a higher priority in the first transmission queue associated with the first modem, and put a second portion of the data with a lower priority in the second queue associated with the second modem. For purposes of illustration only, the vehicle 402 can utilize the first preferred frequency band of the first network to transmit data prior to attempting to transmit data over the second preferred frequency band of the second network. In some instances, the vehicle 402 can also place the image data in the second transmission queue associated with the second network. This can allow the vehicle 402 to attempt to transmit the higher priority data over the network with the higher performance while attempting to transmit the lower priority data over the network with the lower performance. In some instances, the vehicle can determine a threshold (or a threshold associated with a different network parameter) associated with the first network and transmit the lower priority data over the network with the lower performance when the threshold is met or exceeded.

In some instances, the vehicle 402 can send the same data via the first network and the second network (i.e., redundantly) to minimize any risk of loss (e.g., in the case of high priority data-such as when a vehicle or occupant therein is in an emergency situation). If a remote computing device receives the same data, it can be configured to de-duplicate the data. In some instances, the vehicle 402 can provide an indication that the data being transmitted is or might be duplicated data. Duplication of data may be used in regions of high variability of network connectivity to ensure the highest priority items are received.

In some instances, the vehicle 402 can determine and/or select the vehicle data based on the network settings. For example, the vehicle 402 can compress, crop, or otherwise reduce the amount of image data to transmit over the network. In some instances, the vehicle 402 can send a subset of the image data in order to reduce a size of the image data. For example, the vehicle 402 can select image data from a first image sensor of the vehicle 402 and disregard image data from a second image sensor of the vehicle 402. In some instances, the vehicle 402 can determine a region of interest in the image data and compress portions of the image data not associated with the region of interest. In some instances, the vehicle 402 can reduce the transmission frequency by reducing the number of times per second or per minute that the vehicle 402 transmits the vehicle data to the remote computing device. In some instances, the vehicle can determine a transmission frequency based on a speed of the vehicle. For purposes of illustration only, the vehicle 402 can transmit vehicle data less frequently when standing still and increase the transmission frequency as the vehicle 402 accelerates.

In some examples, the vehicle 402 can measure the network parameters as the vehicle 402 traverses the environment 400. Such measured network parameters can be incorporated into the network map data to continuously update the mapped data. In some examples, the vehicle 402 may belong to a fleet that includes multiple vehicles. The multiple vehicles in the fleet may continuously collect network parameters associated with various networks when they traverse the environment 400 and may keep updating the network map data. In some examples, the network map data may be determined based on an average of data collected over a period, such as several days, several weeks, several months, and the like. For example, the network map data may indicate an average throughput performance of a frequency band over a month in a region.

In some examples, different vehicles in the fleet can be divided to connect to different networks and/or different frequency bands when multiple vehicles are within the same area to avoid network congestion.

Referring to FIG. 4C, in some instances, using similar techniques as described above with reference to locations ① and ②, the vehicle 402 can determine that at location 3 there is no network connectivity 410 based on the network map data. For example, the network map data can indicate that neither the first network nor the second network provides network availability at location ③. For location ④, the vehicle 402 can perform similar determinations and determine that the first network is available, where the first network provides coverage at a third network region 412.

Though the vehicle 402 can plan a route such that the vehicle 402 will always have a connection to at least one network, in some instances, the vehicle 402 may have to go through an area without network availability due to unexpected reasons such as a sudden outage and the like. For example, as the vehicle 402 approaches location 3 while traversing the trajectory 404, the vehicle 402 can configure the vehicle data based on recognizing that it will not have network connectivity (or insufficient network connectivity) at location ③. In some instances, the vehicle 402 can determine a new trajectory 414 based on determining that location ③ does not provide network connectivity. The new trajectory 414 can be based at least in part on the network map data and/or updates of the network map data. For example, the vehicle 402 can access network map data indicating that the second network is available at the location ⑤ (e.g., that the second network provides connectivity at location ⑤ as depicted as falling within second network region 408). Then, the vehicle 402 can determine the new trajectory 414 such that it traverses through location ⑤ (instead of through location ③) and is able to pick up the original trajectory 404 at location ④. In some instances, the new trajectory 414 can continue without returning to the initial trajectory 404. In some instances, the vehicle 402 can request additional network map data based on recognizing that a location along the original trajectory does not have network connectivity. In some instances, the vehicle 402 can access the network map data already stored in the vehicle to determine the new trajectory 414.

Figure 5:
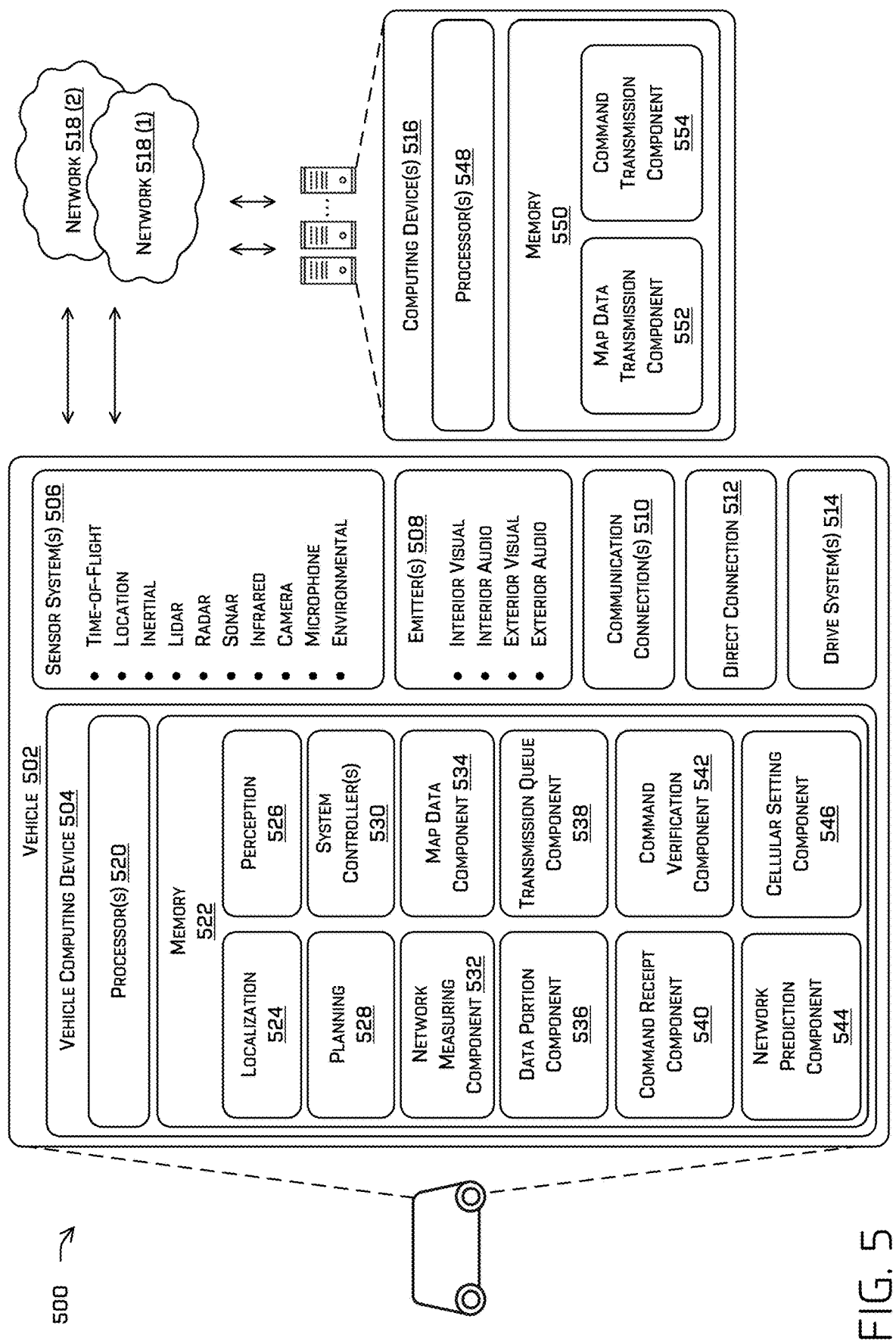
FIG. 5 depicts a block diagram of an example system for implementing the techniques described herein.

FIG. 5 depicts a block diagram of an example system 500 for implementing the techniques discussed herein. In at least one example, the system 500 can include a vehicle 502, which can be similar to the vehicle 202 described above with reference to FIG. 2, the vehicle 302 described above with reference to FIG. 3, and the vehicle 402 described above with reference to FIGS. 4A-4C. In the illustrated example system 500, the vehicle 502 is an autonomous vehicle; however, the vehicle 502 can be any other type of vehicle.

The vehicle 502 can include a vehicle computing device 504, one or more sensor systems 506, one or more emitters 508, one or more communication connections 510 (also referred to as communication devices and/or modems), at least one direct connection 512 (e.g., for physically coupling with the vehicle 502 to exchange data and/or to provide power), and one or more drive systems 514. The one or more sensor systems 506 can be configured to capture sensor data associated with an environment.

The sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperations computing device) or remote services. For instance, the communication connection(s) 510 can facilitate communication with other local computing device(s) on the vehicle 502 and/or the drive system(s) 514. Also, the communication connection(s) 510 can allow the vehicle 502 to communicate with other nearby computing device(s) (e.g., other nearby vehicles, traffic signals, etc.).

The communications connection(s) 510 can include physical and/or logical interfaces for connecting the vehicle computing device 504 to another computing device or one or more external networks 518(1) and/or 518(2) (e.g., the Internet). For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 510 may comprise the one or more modems as described in detail above.

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and control operation of the various vehicle systems. In some examples, the drive system controller can include one or more processors and memory communicatively coupled with the one or more processors. The memory can store one or more modules to perform various functionalities of the drive system(s) 514. Furthermore, the drive system(s) 514 also includes one or more communication connection(s) that enable communication by the respective drive system with one or more other local or remote computing device(s).

The vehicle computing device 504 can be similar to the vehicle computing device 304 described above with reference to FIG. 3. The vehicle computing device 504 can include one or more processors 520 and memory 522 communicatively coupled with the one or more processors 520. In at least one instance, the one or more processors 520 can be similar to the processor(s) 306 and the memory 522 can be similar to the memory 308 described above with reference to FIG. 3. In the illustrated example, the memory 522 of the vehicle computing device 504 stores a localization component 524, a perception component 526, a planning component 528, one or more system controllers 530, a network measuring component 532, a map data component 534, a data portion component 536, a transmission queue component 538, a command receipt component 540, a command verification component 542, and a network prediction component 544. Though depicted as residing in the memory 522 for illustrative purposes, it is contemplated that the localization component 524, the perception component 526, the planning component 528, one or more system controllers 530, the network measuring component 532, the map data component 534, the data portion component 536, the transmission queue component 538, the command receipt component 540, the command verification component 542, and the network prediction component 544 can additionally, or alternatively, be accessible to the vehicle computing device 504 (e.g., stored in a different component of vehicle 502 and/or be accessible to the vehicle 502 (e.g., stored remotely).

The remote computing device 516 can include one or more processors and memory 550 communicatively coupled with the one or more processors 548. In at least one instance, the one or more processors 548 can be similar to the processor(s) 306 and the memory 550 can be similar to the memory 308 described above with reference to FIG. 3. In the illustrated example, the memory 550 of the computing device 516 stores a map data transmission component 552 and a command transmission component 554.

In memory 522 of the vehicle computing device 504, the localization component 524 can include functionality to receive data from the sensor system(s) 506 to determine a position of the vehicle 502. For example, the localization component 524 can include and/or request/receive a three-dimensional map of an environment and can continuously determine a region of the autonomous vehicle within the map. In some instances, the localization component 524 can use SLAM (simultaneous localization and mapping) or CLAMS (calibration, localization, and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory, as discussed herein.

The perception component 526 can include functionality to perform object detection, segmentation, and/or classification. In some examples, the perception component 526 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 526 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The planning component 528 can determine a path for the vehicle 502 to follow to traverse through an environment. For example, the planning component 528 can determine various routes and paths and various levels of detail. In some instances, the planning component 528 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 528 can alternatively, or additionally, use data from the perception component 526 to determine a path for the vehicle 502 to follow to traverse through an environment. For example, the planning component 528 can receive data from the perception component 526 regarding objects associated with an environment. Using this data, the planning component 528 can determine a route to travel from a first location (e.g., a current location) to a second location (e.g., a target location) to avoid objects in an environment. In at least some examples, such a planning component 528 may determine there is no such collision free path and, in turn, provide a path which brings vehicle 502 to a safe stop avoiding all collisions and/or otherwise mitigating damage.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502, which may be configured to operate in accordance with a path provided from the planning component 528.

The network measuring component 532 can determine network parameters at a current location of the vehicle 502. For example, as the vehicle 502 traverses through an environment, the vehicle 502 can determine network parameters using, in some instances, the communication connections 510. As discussed above, the network parameters can include bandwidth data, signal strength data, latency data, jitter data, error rate data, time data, and/or event data. In some instances, a communication connection 510 can connect to a first network and the network measuring component 532 can determine network parameters associated with the first network. In some instances, the communication connection 510 can also connect to a second network and the network measuring component 532 can determine network parameters associated with the second network. In some instances, the vehicle 502 can have multiple communication connections 510 and use a first communication connection to determine network parameters associated with a first network and a second communication connection to determine network parameters associated with a second network.

The map data component 534 can access network map data associated with an environment. For example, the map data component 534 can be loaded with the network map data prior to operating the vehicle 502 in an environment. In some examples, the network map data may be data associated with the map described above with respect to the localization component 524. In some instances, the network map data can represent location and/or condition-based network parameters such as bandwidth data, signal strength data, throughput data, latency data, jitter data, error rate data. For example, condition data can include time data, weather data, event data, and the like. In some instances, the map data component 534 can request the network map data from a remote computing device 516. For example, the map data transmission component 552 of the computing device 516 can respond to the request and transmit the network map data to the map data component 534. Then the map data component 534 can store the network map data in the map data component 534. In some instances, the map data component 534 can request network map updates from the map data transmission component 552 to update the network map data stored in the map data component 534.

In some instances, the map data component 534 can be configured to update the network map data stored in the computing device 516 at the map data transmission component 552. For example, the network measuring component 532 can determine network parameters associated with a first network 518(1). Then, the map data component 534 can use the network parameters to determine a network map update which can be transmitted to the computing device 516 allowing other vehicles to obtain the updated network map data. In some instances, the map data component 534 may provide measured network parameters directly to computing device 516 such that the computing device 516 may update locally stored maps based on, for example, Bayesian filtering, weighted averages, or the like. In some instances, the map data component 534 can determine that a portion of the trajectory passes through areas without network connectivity and instruct the planning component 528 to determine a new trajectory for the vehicle to follow based on the network map data.

The data portion component 536 can determine and/or configure the vehicle data for transmission. For example, the vehicle 502 can determine vehicle data by capturing sensor data using sensor system(s) 506. Additionally, in some instances, the vehicle 502 can determine vehicle data as including vehicle status data, vehicle diagnostic data, and/or vehicle metrics. In some examples, various components (including sensor system(s) 506) may transmit information between one another as one or more messages, and, in some instances, may comprise (or otherwise be referred to as having) associated message topics. Based on the network parameters determined by the network measuring component 532, the data portion component 536 can determine portions of the vehicle data (e.g., subsets of the one or more messages) as well as a priority level associated with various portions of the vehicle data. By way of example, and without limitation, the data portion component 536 can determine that the vehicle diagnostic data and the vehicle status data have a higher priority level than the network map update data determined by the network measuring component 532. Then the data portion component 536 can associate the portions of data with a network and/or with a priority level. In some examples, priority levels may be assigned based on context (e.g., what the vehicle is doing, needs to do, location, maneuver being performed, etc.) and/or topic.

In some examples, the data portion component 536 can determine data to be sent to a remote computing device based at least in part on a request from the remote computing device. For example, a remote computing device can request pose data associated with the vehicle 502 and/or bounding box(es) determined by the perception component 526 representing one or more objects in an environment proximate to the vehicle 502. Accordingly, the data portion component 536 can prioritize data accordingly and transmit the data to the remote computing device, as discussed herein.

The transmission queue component 538 can place portions of the vehicle data into an appropriate queue. The communication connection(s) 510 (also referred to as communication devices and/or modems) can include a transmission queue similar to the first transmission queue 316 and the second transmission queue 314 as discussed with reference to FIG. 3. The transmission queue component 538 can access the data portions determined by the data portion component 536 and, based on the network and/or priority level associated with the data portions), associate the data portions with the appropriate transmission queue. For example, the transmission queue component 538 can access a first portion of the vehicle data that has a higher priority level than a second portion of the vehicle data. Then, the transmission queue component 538 can use the network parameters measured by the network measuring component 532 to determine that a first transmission queue is associated with a first network 518(1) that has more network availability than a second transmission queue that is associated with a second network 518(2). Then, the transmission queue component 538 can associate the first portion of the vehicle data with the first transmission queue.

In some instances, the transmission queue component 538 can broadcast the portions of vehicle data and place the portions of vehicle data into both transmission queues. In some instances, the transmission queue component can determine that a portion of the vehicle data in a transmission queue is stale or no longer relevant and remove the stale portion of vehicle data from the transmission queue.

The command receipt component 540 can receive a command from the command transmission component 554 of the computing device 516. For example, the vehicle 502 can transmit the vehicle data to the computing device 516. As discussed above, the vehicle 502 can also send a request to a teleoperations device to obtain guidance to resolve uncertainty. The transmission queue component 538 can queue up portions of the vehicle data and cause it to be transmitted by the communication connections 510 via the networks 518 to the command transmission component 554. The command transmission component can receive a command from a teleoperator and/or determine a command to be transmitted and sent to the command receipt component 540.

The command verification component 542 can verify the command received at the command receipt component 540. For example, the vehicle 502 can determine that the vehicle data transmitted to the computing device 516 can allow for a particular set of guidance to be received from the computing device 516 and/or the teleoperator. After receiving the command at the command receipt component 540, the command verification component 542 can determine if the received command falls within the set of guidance that is associated with the vehicle data transmitted to the computing device 516. In some instances, the command verification component 542 can ignore the received command. In some instances, the command verification component 542 can request an updated command. In some instances, the vehicle 502 can determine a set of utilities and/or user interfaces associated with the transmitted vehicle data such that the computing device 516 and/or the teleoperator must select a command from a limited set of commands.

The network prediction component 544 can use the measured network parameters and the network map data to predict network parameters in various regions. As discussed above, the network prediction component 544 can use prediction algorithms such as Kalman filtering, extended Kalman filtering, and/or weighted averages to determine the predicted network parameters. The prediction of network parameters may be implemented utilizing the techniques described in U.S. Pat. No. 11,042,153, filed Dec. 21, 2018, and entitled "Adaptive Multi-network Vehicle Architecture," the contents of which are incorporated herein by reference in its entirety and for all purposes. In some instances, the data portion component can use the predicted network parameters determined by the network prediction component 544 to determine portions of the vehicle data and/or assign priority levels to the portions of the vehicle data. Similar to the network measuring component 532, the network prediction component 544 can determine that portions of the trajectory do not provide the necessary network parameters to operate according to the operating procedures of the current trajectory and/or objective. The network prediction component 544 can instruct the planning component 528 to determine a new trajectory based on the predicted network parameters.

The cellular setting component 546 can determine a cellular setting associated with a trajectory of the vehicle 502 by determining which network is preferred and which frequency bands are preferred in each region along the trajectory of the vehicle 502 based on the network parameters, before the vehicle 502 transverse the trajectory. The vehicle 502 can save the cellular setting (e.g., in the form of a file) in a database. In some examples, the vehicle 502 can switch networks and/or frequency bands based on the saved cellular setting as the vehicle 502 traverses different regions along the trajectory.

The processor(s) 520 of the vehicle 502, the processor(s) 548 of the computing device 516, and the processor(s) 306 of the vehicle computing device 304 of FIG. 3 can be any suitable processor capable of executing instructions to process data and perform operations as described herein. By way of example and not limitation, the processor(s) 520, 548, and 306 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 522 of the vehicle 502, the memory 550 of the computing device 516, and the memory 308 of the vehicle computing device 304 of FIG. 3 are examples of non-transitory computer-readable media. The memory 522, 550, and 308 can store an operating system and one or more software applications, instructions, programs, and/or data to implement the methods described herein and the functions attributed to the various systems. In various implementations, the memory 522, 550, and 308 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 522, 550, and 308 can be implemented as a neural network.

Figure 6:
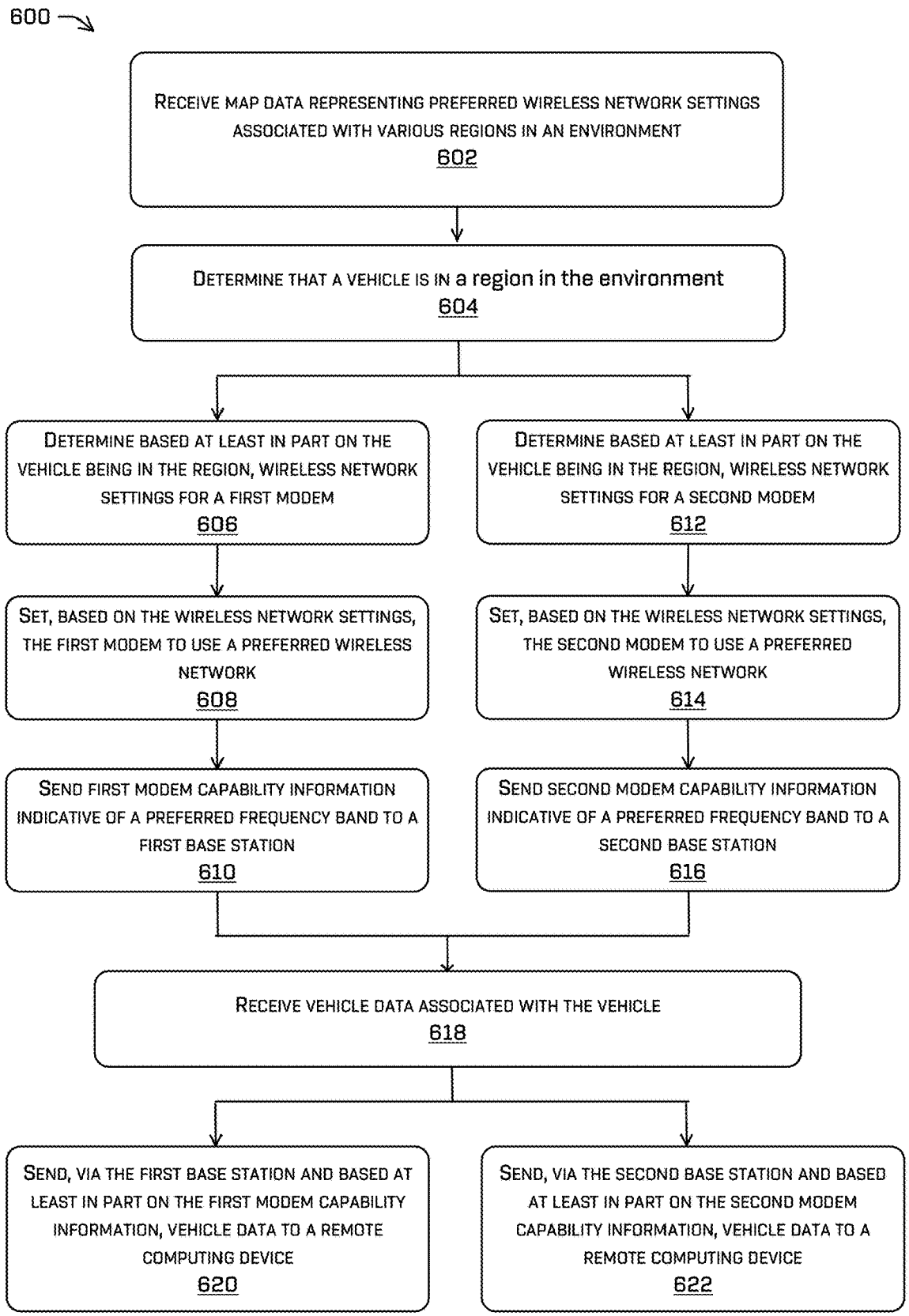
FIG. 6 depicts a flow diagram representative of an example process for adaptive multi-network multi-band vehicle communications as described herein.

FIG. 6 depicts a flow diagram representative of an example process 600 for adaptive multi-network multi-band vehicle communications as described herein. In some instances, some or all of process 600 can be performed by one or more components in FIG. 3 or 5, as described herein. The process 600 is described with reference to the vehicle 302 in FIG. 3, the vehicle 402 in FIGS. 4A-4C, and/or the vehicle 502 in FIG. 5. Additionally, some portions of process 600 can be omitted, replaced, and/or reordered while still providing the functionality of determining whether a computing device should remain in a standby state.

At 602, operations can include receiving map data representing preferred wireless network settings associated with various regions in an environment, such as preferred wireless network settings associated with a preferred wireless network, a preferred channel, a preferred carrier, a preferred frequency band, etc. As discussed herein, there can be an initial mapping stage (step zero) where a vehicle (and/or one or more other vehicles in a fleet of vehicles) may drive around and collect various network parameters (e.g., available frequency bands, delays, throughputs, etc.). Then, the map data can be built based on the network parameters collected by one or more vehicles. The map data can indicate, for different locations in an environment, which wireless network (e.g., Verizon, T-Mobile, AT&T, and the like) is preferred, and which frequency band is preferable. In some examples, the network map data can be represented as heat map data as depicted in FIG. 1. In some examples, a fleet of vehicles can contribute to data collection for generating the map data. In some instances, each vehicle of the fleet can measure the network parameters associated with various networks as the vehicle traverses an environment. Such measured network parameters can be incorporated into the map data to continuously update the map data. In some instances, the map data can be stored in a remote computing device. In some instances, the map data can be stored in the memory of the vehicle.

At 604, operations can include determining that a vehicle is in a region in the environment. For example, the localization component 524 of the vehicle 502 can include functionality to receive data from the sensor system(s) 506 to determine a position of the vehicle 502.

At 606, operations can include determining based at least in part on the vehicle being in the region, wireless network settings for a first modem. For example, the cellular setting component 546 can determine which network to connect to and which frequency bands to report to the base station per region in the environment.

At 608, operations can include setting, based on the wireless network settings, the first modem to use the preferred wireless network. For example, the preferred wireless network may have a better performance such as more bandwidth available, lower latency, higher signal strength, higher throughput, and the like.

At 610, operations can include sending first modem capability information indicative of the preferred frequency band to a first base station. For example, the first modem can send a first capability message to the first base station indicating the capability of the first modem, indicating that the first modem is a 4G modem and can support frequencies 1, 2, and 3. The first base station can receive the first capability message from the first modem and then send a first response message back to the first modem, indicating that the first modem can use frequency 3.

At 612, operations can include determining based at least in part on the vehicle being within the region, wireless network settings for a second modem. For example, the cellular setting component 546 can determine which network to connect to and which frequency bands to report to the base station per region in the environment.

At 614, operations can include setting, based on the wireless network settings, the second modem to use the preferred wireless network. For example, the preferred wireless network may have a better performance such as more bandwidth available, lower latency, higher signal strength, higher throughput, and the like.

At 616, operations can include sending second modem capability information indicative of the preferred frequency band to a second base station. For example, the second modem can send a second capability message to the second base station indicating the capability of the second modem, indicating that the second modem is a 4G modem and can support frequencies 4 and 5. The second base station can receive the second capability message from the second modem and then send a second response message back to the second modem, indicating that the second modem can use frequency 4.

At 618, operations can include receiving vehicle data associated with the vehicle. In some examples, the vehicle data can include sensor data captured by a sensor of the vehicle, derivative data therefrom (e.g., object detections, predictions, etc.), diagnostic data of the vehicle (e.g., faults, status, etc.), vehicle pose data, and/or trajectory data indicating a trajectory of the vehicle. For example, the vehicle 502 can use one or more sensor systems 506 to capture sensor data of an environment as the vehicle data. In some instances, the vehicle 502 can calculate a trajectory as the vehicle data. In some instances, the vehicle 502 can determine portions of the vehicle data as vehicle status, vehicle position data, and/or vehicle diagnostic data. Then the data portion component 536 can associate a priority level with the portions of vehicle data.

At 620, operations can include sending, via the first base station and based at least in part on the first modem capability information, vehicle data to a remote computing device. In some instances, the transmission queue component 538 can associate a first portion of the vehicle data with a first transmission queue to transmit via communication connection(s) 510 over networks 518(1) and 518(2). Similarly, the transmission queue component 538 can associate a second portion of the vehicle data with a second transmission queue to transmit via communication connection(s) 510 over networks 518(1) and 518(2). As discussed above, the first transmission queue can be associated with a first network and the second transmission queue can be associated with a second network. In some instances, the first transmission queue can be a higher priority queue and the second transmission queue can be a lower priority queue regardless of network association.

At 622, operations can include sending, via the second base station and based at least in part on the second modem capability information, vehicle data to a remote computing device.

Accordingly, the techniques discussed herein provide a robust implementation of an adaptive multi-network multi-band vehicle architecture to allow a vehicle to maintain and/or optimize network and frequency band performance and to continue operating in different regions in an environment.

EXAMPLE CLAUSES

A: A system of an autonomous vehicle, the system comprising: a first wireless modem; a second wireless modem; a sensor; one or more processors; and one or more non-transitory computer-readable media storing computer-executable instructions that, when executed, cause the system to perform operations comprising: determining that the first wireless modem is associated with a communication; receiving map data representing preferred wireless network settings associated with multiple regions in an environment, a region of the multiple regions associated with a preferred wireless network and a preferred frequency band; determining that the autonomous vehicle is within the region; determining, based at least in part on the first wireless modem being associated with the communication and the autonomous vehicle being within the region, wireless network settings for the second wireless modem; setting, based on the wireless network settings, the second wireless modem to use the preferred wireless network; sending modem capability information indicative of the preferred frequency band to a base station; receiving vehicle data associated with the autonomous vehicle; and sending, via the second wireless modem and to the base station and based at least in part on the modem capability information, data based on the vehicle data to a remote computing device.

B: The system of paragraph A, wherein: the second wireless modem is configurable to use a number of frequency bands; setting the second wireless modem to use the preferred wireless network comprises updating a parameter associated with a Subscriber Identity Module (SIM); and sending the modem capability information indicative of the preferred frequency band to the base station comprises sending an indication of a frequency band subset that is less than the number of frequency bands that the second wireless modem is configurable to use.

C: The system of either paragraph A or B, wherein the preferred wireless network settings maximize an upload throughput based on a wireless network and a frequency band associated with the region.

D: The system of any one of paragraphs A-C, wherein the first wireless modem is associated with a first wireless network, and the second wireless modem is associated with a second wireless network different than the first wireless network.

E: The system of any one of paragraphs A-D, further comprising putting a portion of the data into a first queue associated with the first wireless modem or a second queue associated with the second wireless modem at least based on a data type, a size of the first queue, a size of the second queue, and a data priority.

F: One or more non-transitory computer-readable media storing instructions executable by one or more processors, wherein the instructions, when executed, cause the one or more processors to perform operations comprising: receiving map data representing preferred wireless network settings associated with multiple regions in an environment, a region of the multiple regions associated with a preferred wireless network and a preferred frequency band; determining that a vehicle is within the region; determining, based at least in part on the vehicle being within the region and the map data, wireless network settings for a modem; sending, based at least in part on the wireless network settings, modem capability information indicative of the preferred frequency band to a base station; receiving vehicle data associated with the vehicle; and sending, to the base station and based at least in part on the modem capability information, the vehicle data to a remote computing device.

G: The one or more non-transitory computer-readable media of paragraph F, wherein the vehicle data includes at least one of sensor data, vehicle pose data, derivative data, diagnostic data, or trajectory data associated with the vehicle.

H: The one or more non-transitory computer-readable media of either paragraph F or G, further comprising determining the preferred wireless network settings based at least in part on at least one of: bandwidth data, signal strength data, throughput data, time data, latency data, jitter data, error rate data, or location data.

I: The one or more non-transitory computer-readable media of any one of paragraphs F-H, wherein the modem is a first modem associated with a first preferred wireless network, the base station is a first base station, the vehicle further includes a second modem, and the operations further comprise: determining, based at least in part on the vehicle being within the region and the map data, second wireless network settings for the second modem; setting, based on the second wireless network settings, the second modem to use a second preferred wireless network; sending second modem capability information indicative of a second preferred frequency band to a second base station; and sending, via the second base station and based at least in part on the second modem capability information, additional data to a remote computing device.

J: The one or more non-transitory computer-readable media of paragraph I, the operations further comprising putting a portion of the data into a first queue associated with the first modem or a second queue associated with the second modem at least based on a data type, a size of the first queue, a size of the second queue, and data priority.

K: The one or more non-transitory computer-readable media of any one of paragraphs F-J, wherein the region is a first region, the preferred wireless setting is a first wireless setting, and the operations further comprise: determining a trajectory for the vehicle to follow; determining, based at least in part on the trajectory, that the vehicle will enter a second region; and based at least in part on determining that the vehicle will enter the second region and the map data, updating the wireless network settings for the modem.

L: The one or more non-transitory computer-readable media of paragraph K, further comprising: determining, based at least in part on the trajectory, that the vehicle will enter a third region with no network connectivity; and based at least in part on determining that the vehicle will enter the third region with no network connectivity, updating the trajectory for the vehicle.

M: The one or more non-transitory computer-readable media of any one of paragraphs F-L, the operations further comprising: determining, with the modem associated with a wireless network, measured parameters; transmitting, via the modem to a data store, the measured parameters, the measured parameters representing at least one of: bandwidth data, signal strength data, throughput data, time data, latency data, jitter data, error rate data, or location data.

N: The one or more non-transitory computer-readable media of any one of paragraphs F-M further comprising: determining a performance of the preferred frequency band; determining whether the performance of the preferred frequency band is lower than a threshold; and upon determining that the performance of the preferred frequency band is lower than the threshold, sending an updated first modem capability information indicative of another preferred frequency band to the base station.

O: A method comprising: receiving map data representing preferred wireless network settings associated with multiple regions in an environment, a region of the multiple regions associated with a preferred wireless network and a preferred frequency band; determining that a vehicle is within the region; determining, based at least in part on the vehicle being within the region and the map data, wireless network settings for a modem; sending, based at least in part on the wireless network settings, modem capability information indicative of the preferred frequency band to a base station; receiving vehicle data associated with the vehicle; and sending, to the base station and based at least in part on the modem capability information, the vehicle data to a remote computing device.

P: The method of paragraph O, wherein the vehicle data includes at least one of sensor data, derivative data, vehicle pose data, diagnostic data, or trajectory data associated with the vehicle.

Q: The method of either paragraph O or P, further comprising determining the preferred wireless network settings based at least in part on at least one of: bandwidth data, signal strength data, throughput data, time data, latency data, jitter data, error rate data, or location data.

R: The method of any one of paragraphs O-Q, wherein the modem is a first modem associated with a first preferred wireless network, the base station is a first base station, the vehicle further includes a second modem, and the method further comprises: determining, based at least in part on the vehicle being within the region and the map data, second wireless network settings for the second modem; setting, based on the second wireless network settings, the second modem to use a second preferred wireless network; sending second modem capability information indicative of a second preferred frequency band to a second base station; and sending, via the second base station and based at least in part on the second modem capability information, additional data to a remote computing device.

S: The method of paragraph R, further comprising putting a portion of the data into a first queue associated with the first modem or a second queue associated with the second modem at least based on a data type, a size of the first queue, a size of the second queue, and data priority.

T: The method of either paragraph R or S, wherein the region is a first region, the preferred wireless setting is a first wireless setting, and the method further comprises: determining a trajectory for the vehicle to follow; determining, based at least in part on the trajectory, that the vehicle will enter a second region; and based at least in part on determining that the vehicle will enter the second region and the map data, updating the wireless network settings for the modem.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes, or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system of an autonomous vehicle, the system comprising:
   a first wireless modem;
   a second wireless modem;
   one or more processors; and
   one or more non-transitory computer-readable media storing computer-executable instructions that, when executed, cause the system to perform operations comprising:
      receiving map data representing multiple regions in an environment, wherein the map data comprises preferred wireless network settings to be used by the autonomous vehicle when the autonomous vehicle is in respective individual regions of the multiple regions in the environment, wherein the preferred wireless network settings are associated in the map data with a first region of the multiple regions and indicate a preferred wireless network and a preferred frequency band to be used by the autonomous vehicle when the autonomous vehicle is in the first region;
      determining that the autonomous vehicle is within the first region of the multiple regions;
      determining, based at least in part on the map data, wireless network settings for the second wireless modem, wherein the wireless network settings for the second wireless modem indicate the preferred wireless network and the preferred frequency band based at least in part on:
         the autonomous vehicle being determined to be within the first region, and
         the map data associating the first region with the preferred wireless network settings;
      setting, based on the wireless network settings for the second wireless modem, the second wireless modem to use the preferred wireless network associated with indicated by the map data to be used by the autonomous vehicle when in the first region;
      sending modem capability information indicative of the preferred frequency band to be used by the autonomous vehicle when in the first region to a base station;
      receiving vehicle data associated with the autonomous vehicle; and
      sending, via the second wireless modem and to the base station and based at least in part on the modem capability information, data based on the vehicle data to a remote computing device.

2. The system of claim 1, wherein:
   the second wireless modem is configurable to use a number of frequency bands;
   setting the second wireless modem to use the preferred wireless network comprises updating a parameter associated with a Subscriber Identity Module (SIM); and
   sending the modem capability information indicative of the preferred frequency band to the base station comprises sending an indication of a frequency band subset that is less than the number of frequency bands that the second wireless modem is configurable to use.

3. The system of claim 1, wherein the preferred wireless network settings maximize an upload throughput based on a wireless network and a frequency band associated with the first region.

4. The system of claim 1, wherein the first wireless modem is associated with a first wireless network, and the second wireless modem is associated with a second wireless network different than the first wireless network.

5. The system of claim 1, further comprising putting a portion of the data into a first queue associated with the first wireless modem or a second queue associated with the second wireless modem at least based on a data type, a size of the first queue, a size of the second queue, and a data priority.

6. One or more non-transitory computer-readable media storing instructions executable by one or more processors, wherein the instructions, when executed, cause the one or more processors to perform operations comprising:
   receiving map data representing multiple regions in an environment, the map data comprising preferred wireless network settings, wherein:
      the preferred wireless network settings are to be used by a vehicle when the vehicle is in respective individual regions of the multiple regions in the environment,
      the preferred wireless network settings are associated in the map data with a region of the multiple regions, and
      the preferred wireless network settings are associated in the map data with a preferred wireless network and a preferred frequency band;
   determining that the vehicle is within the region;
   determining, based at least in part on the map data, first wireless network settings for a first modem associated with a first preferred wireless network, wherein the first wireless network settings are determined based at least in part on:
      the vehicle being within the region, and
      the map data associating the region with the first wireless network settings;
   determining second wireless network settings for a second modem, wherein the second wireless network settings are determined based at least in part on the vehicle being within the region and the map data;
   setting, based at least in part on the second wireless network settings, the second modem to use a second preferred wireless network;
   sending, based at least in part on the first wireless network settings, modem capability information indicative of the preferred frequency band to a base station;
   receiving vehicle data associated with the vehicle; and
   sending, to the base station and based at least in part on the modem capability information, the vehicle data to a remote computing device.

7. The one or more non-transitory computer-readable media of claim 6, wherein the vehicle data includes at least one of sensor data, vehicle pose data, derivative data, diagnostic data, or trajectory data associated with the vehicle.

8. The one or more non-transitory computer-readable media of claim 6, further comprising determining the preferred wireless network settings based at least in part on at least one of:
   bandwidth data,
   signal strength data,
   throughput data,
   time data, latency data,
jitter data,
error rate data, or
location data.

9. The one or more non-transitory computer-readable media of claim 6, wherein the base station is a first base station, and
the operations further comprise:
sending second modem capability information indicative of a second preferred frequency band to a second base station; and
sending, via the second base station and based at least in part on the second modem capability information, additional data to the remote computing device or another remote computing device.

10. The one or more non-transitory computer-readable media of claim 9, the operations further comprising putting a portion of the additional data into a first queue associated with the first modem or a second queue associated with the second modem at least based on a data type, a size of the first queue, a size of the second queue, and data priority.

11. The one or more non-transitory computer-readable media of claim 6, wherein the region is a first region, the preferred wireless network settings is a first wireless network settings, and the operations further comprise:
determining a trajectory for the vehicle to follow;
determining, based at least in part on the trajectory, that the vehicle will enter a second region; and
based at least in part on determining that the vehicle will enter the second region and the map data, updating at least one of the first wireless network settings for the first modem or the second wireless network settings for the second modem.

12. The one or more non-transitory computer-readable media of claim 11, further comprising:
determining, based at least in part on the trajectory, that the vehicle will enter a third region with no network connectivity; and
based at least in part on determining that the vehicle will enter the third region with no network connectivity, updating the trajectory for the vehicle.

13. The one or more non-transitory computer-readable media of claim 6, the operations further comprising:
determining, with at least one of the first modem or the second modem, measured parameters;
transmitting, via at least one of the first modem or the second modem to a data store, the measured parameters, the measured parameters representing at least one of:
bandwidth data,
signal strength data,
throughput data,
time data,
latency data,
jitter data,
error rate data, or
location data.

14. The one or more non-transitory computer-readable media of claim 6 further comprising:
determining a performance of the preferred frequency band;
determining whether the performance of the preferred frequency band is lower than a threshold; and
upon determining that the performance of the preferred frequency band is lower than the threshold, sending an updated first modem capability information indicative of another preferred frequency band to the base station.

15. A method comprising:
receiving map data representing multiple regions in an environment, the map data comprising preferred wireless network settings, wherein:
the preferred wireless network settings are to be used by a vehicle when the vehicle is in respective individual regions of the multiple regions in the environment,
the preferred wireless network settings are associated in the map data with a region of the multiple regions, and
the preferred wireless network settings are associated in the map data with a preferred wireless network and a preferred frequency band;
determining that the vehicle is within the region;
determining, based at least in part on the map data, first wireless network settings for a first modem associated with a first preferred wireless network, wherein the first wireless network settings are determined based at least in part on:
the vehicle being within the region, and
the map data associating the region with the first wireless network settings;
determining second wireless network settings for a second modem, wherein the second wireless network settings are determined based at least in part on the vehicle being within the region and the map data;
setting, based at least in part on the second wireless network settings, the second modem to use a second preferred wireless network;
sending, based at least in part on the first wireless network settings, modem capability information indicative of the preferred frequency band to a base station;
receiving vehicle data associated with the vehicle; and
sending, to the base station and based at least in part on the modem capability information, the vehicle data to a remote computing device.

16. The method of claim 15, further comprising determining the preferred wireless network settings based at least in part on at least one of:
bandwidth data,
signal strength data,
throughput data,
time data,
latency data,
jitter data,
error rate data, or
location data.

17. The method of claim 15, wherein the base station is a first base station, the vehicle further includes a second modem, and
the method further comprises:
sending second modem capability information indicative of a second preferred frequency band to a second base station; and
sending, via the second base station and based at least in part on the second modem capability information, additional data to the remote computing device or another remote computing device.

18. The method of claim 17, further comprising putting a portion of the additional data into a first queue associated with the first modem or a second queue associated with the second modem at least based on a data type, a size of the first queue, a size of the second queue, and data priority.

19. The method of claim 17, wherein the region is a first region, the preferred wireless network settings is a first wireless network settings, and the method further comprises:

determining a trajectory for the vehicle to follow;

determining, based at least in part on the trajectory, that the vehicle will enter a second region; and based at least in part on determining that the vehicle will enter the second region and the map data, updating at least one of the first wireless network settings for the first modem or the second wireless network settings for the second modem.

20. The system of claim 1, wherein:

the operations further comprise:

receiving a communication associated with a first wireless connection, wherein the first wireless connection comprises at least one of a latency, a bandwidth, a throughput or a network attribute, determining, based at least in part on receiving the communication, that the first wireless modem is associated with the communication, and determining, based at least in part on the first wireless modem being associated with the communication, at least one of the latency, the bandwidth, the throughput or the network attribute of the first wireless connection; and wherein the wireless network settings for the second wireless modem are determined further based at least in part on the latency, the bandwidth, the throughput or the network attribute of the first wireless connection.

\* \* \* \* \*